(12) United States Patent
Zheng et al.

(10) Patent No.: US 12,288,392 B2
(45) Date of Patent: Apr. 29, 2025

(54) METHOD FOR TRAINING OBJECT DETECTION MODEL, OBJECT DETECTION METHOD AND APPARATUS

(71) Applicant: BOE TECHNOLOGY GROUP CO., LTD., Beijing (CN)

(72) Inventors: Rui Zheng, Beijing (CN); Xiaojun Tang, Beijing (CN); Zhanfu An, Beijing (CN); Guangwei Huang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/797,034

(22) PCT Filed: May 31, 2021

(86) PCT No.: PCT/CN2021/097507
§ 371 (c)(1),
(2) Date: Aug. 2, 2022

(87) PCT Pub. No.: WO2022/252089
PCT Pub. Date: Dec. 8, 2022

(65) Prior Publication Data
US 2024/0185590 A1  Jun. 6, 2024

(51) Int. Cl.
*G06V 10/82* (2022.01)
*G06V 10/77* (2022.01)
*G06V 10/80* (2022.01)

(52) U.S. Cl.
CPC .......... *G06V 10/82* (2022.01); *G06V 10/7715* (2022.01); *G06V 10/806* (2022.01)

(58) Field of Classification Search
CPC .. G06V 10/82; G06V 10/7715; G06V 10/806; G06V 10/454; G06V 10/764; G06V 10/70; G06N 3/04
USPC ........................................................ 382/181
See application file for complete search history.

(56) References Cited

U.S. PATENT DOCUMENTS

| 2022/0156534 | A1* | 5/2022 | Cai | G06N 3/045 |
| 2022/0189142 | A1* | 6/2022 | Wang | G06T 3/4038 |
| 2022/0207741 | A1* | 6/2022 | Wang | G06V 40/161 |
| 2022/0414869 | A1* | 12/2022 | Butler | G06V 10/454 |
| 2023/0005111 | A1* | 1/2023 | Fan | G06V 10/82 |
| 2024/0160194 | A1* | 5/2024 | Bakhshmand | G06N 3/047 |

* cited by examiner

*Primary Examiner* — Ali Bayat
(74) *Attorney, Agent, or Firm* — XSENSUS LLP

(57) ABSTRACT

A method for training an object detection model includes: firstly obtaining M sample image sets; then, obtaining an initial object detection model; and finally, training the initial object detection model by using the M sample image sets to obtain the object detection model. A sample image set includes at least one sample image and object type(s) of object(s) in each sample image. An object type corresponds to one sample image set, and the M sample image sets correspond to N object types.

20 Claims, 8 Drawing Sheets

Perform detection of objects of N object types on each image to be detected, obtain and display object type(s) and detection frame(s) of at least one object in the image to be detected

METHOD FOR TRAINING OBJECT DETECTION MODEL, OBJECT DETECTION METHOD AND APPARATUS

CROSS-REFERENCE TO RELATED APPLICATION

This application is a national phase entry under 35 USC 371 of International Patent Application No. PCT/CN2021/097507, filed on May 31, 2021, which is incorporated herein by reference in its entirety.

TECHNICAL FIELD

The present disclosure relates to the field of intelligent recognition technologies, and in particular, to a method for training an object detection model, an object detection method and an object detection apparatus.

BACKGROUND

Object detection is an important research in the field of computer vision. By performing object detection on images taken by a camera, objects of multiple types (e.g., human, animal and object of other type) contained in the images are determined. Object detection is widely applied in the fields of vehicle assisted driving, intelligent monitoring, intelligent robot, etc.

In a process of detecting the objects of multiple types, sample images containing objects of multiple types may be firstly obtained; then, the objects of multiple types in the sample images are marked; next, an object detection model is trained by using the marked sample images; and finally, the trained object detection model is used to detect the objects of multiple types in the images.

SUMMARY

In an aspect, a method for training an object detection model is provided. The method includes: firstly obtaining M sample image sets; then obtaining an initial object detection model, the initial object detection model including M network layers or an object detection network, the M network layers each being used for detecting at least one object of at least one object type, a number of output channels of the object detection network being N, and the object detection network being used for detecting objects of N object types; and finally training the initial object detection model by using the M sample image sets to obtain the object detection model.

A sample image set includes at least one sample image and at least one object type of at least one object in each sample image. An object type corresponds to one sample image set, the M sample image sets correspond to N object types. M is a positive integer less than or equal to N, and N is a positive integer greater than 1.

In some embodiments, obtaining the initial object detection model includes: obtaining a first model; determining N network layers according to a detection output network, and replacing the detection output network of the first model with the N network layers, a second-layer feature extraction network being connected to the N network layers, and M being equal to N; and determining that a modified first model is the initial object detection model.

The first model includes: a first-layer feature extraction network, the second-layer feature extraction network and the detection output network. The first-layer feature extraction network is capable of extracting a feature map from an input of the first model to obtain a first-layer feature map. The second-layer feature extraction network is capable of performing feature fusion on the first-layer feature map to obtain a second-layer feature map. The detection output network is capable of detecting at least one object and at least one position corresponding to the at least one object in the second-layer feature map.

In some other embodiments, training the initial object detection model by using the M sample image sets to obtain the object detection model, includes: determining a one-to-one correspondence relationship between the M sample image sets and the N network layers of the initial object detection model; marking the sample image set and a corresponding network layer with a same training identifier, a training identifier is used to mark one sample image set and one network layer; and training, by using each marked sample image set, the first-layer feature extraction network, the second-layer feature extraction network and the corresponding network layer having the same training identifier as the marked sample image set of the initial object detection model layer to obtain the object detection model.

In some other embodiments, determining the N network layer according to the detection output model, includes: determining that the detection output network is a group of detection units, and determining that each network layer in the N network layers includes at least one group of detection units;

or modifying the detection output network to obtain the group of detection units, and determining that each network layer in the N network layers includes the at least one group of detection units. A number of groups of detection units included in each network layer is one, two or three.

In some other embodiments, modifying the detection output network to obtain the group of detection units, includes: modifying a size of a convolutional kernel of a convolutional layer in a case where the detection output network includes the convolutional layer, and determining that a modified convolution layer, a batch normalization (BN) layer and a rectified linear unit (ReLU) constitute the group of detection units. The size of the modified convolution kernel is 3×3, 5×5, or 7×7, and in the group of detection units, the modified convolution layer is connected to the BN layer, and the BN layer is connected to the ReLU.

Or, modifying the detection output network to obtain the group of detection units, includes: determining that the convolutional layer, the BN layer and the ReLU constitute the group of detection units. In the group of detection units, the convolution layer is connected to the BN layer, and the BN layer is connected to the ReLU.

In some other embodiments, the first model is a network model generated based on an anchor manner.

In some other embodiments, determining the initial object detection model, includes: obtaining a second model; modifying a number of output channels of the object detection network of the second model to be N; and determining that a modified second model is the initial object detection model. The second model includes: a down-sampling module, an up-sampling module, an object detection network and an object position detection network. The object detection network of the second model is used for detecting an object type of an object of at least one object type, and the object position detection network is used for detecting a position of the object of at least one object type.

In some other embodiments, the object position detection network includes a height and width detection network and a center point detection network; the height and width detection network is used for detecting a height and width of the object of at least one object type, and the center point detection network is used for detecting a position of a center point of the object of at least one object type. The method further includes: modifying a number of output channels of the high and width detection network of the second model to be 2, and modifying a number of output channels of the center point detection network of the second model to be 2.

In some other embodiments, the second model is a network model generated based on an anchor-free manner.

In some other embodiments, obtaining the initial object detection model, includes: obtaining M first models, the M first models being determined as the initial object detection model. A first model in the M first models includes a first-layer feature extraction network, a second-layer feature extraction network and a detection output network; the first-layer feature extraction network is capable of extracting a feature map from an input of the first model to obtain a first-layer feature map, the second-layer feature extraction network is capable of performing feature fusion on the first-layer feature map to obtain a second-layer feature map, and the detection output network is capable of detecting at least one object and at least one position corresponding to the at least one object in the second-layer feature map.

In some other embodiments, training the initial object detection model by using the M sample image sets to obtain the object detection model, includes: determining a number of layers of a shared network corresponding to the M first models, the number of layers of the shared network being set according to at least one of N and a total number of sample images included in the M sample image sets; inputting the M sample image sets to the M first models, respectively; training, by using each sample image set, other networks except the shared network that remains unchanged in a corresponding first model, so as to obtain M trained first models, the shared network being a network constituted by first X networks in the first model, and X being the number of layers of the shared network; and splicing the shared network and other networks except the shared network in each of the M trained first models to obtain the object detection model, in the object detection model, the shared network being connected to the other networks.

In some other embodiments, during training the first-layer feature extraction network, the second-layer feature extraction network and the network layer having the same training identifier as the marked sample image set of the initial object detection model layer by using each marked sample image set to obtain the object detection model, the method further includes: obtaining objects in at least one sample image output from the initial object detection model when the at least one sample image in each marked sample image set is input to the initial object detection model to perform object detection; and the method further includes: adopting a preset loss function to obtain an average loss value corresponding to each marked sample image set according to objects of at least one object type in the at least one sample image and the objects in the at least one sample image output from the initial object detection model; and adopting a stochastic gradient descent manner to update the object detection model according to the average loss value corresponding to each marked sample image set.

In some other embodiments, during training the first-layer feature extraction network, the second-layer feature extraction network and the network layer having the same training identifier as the marked sample image set of the initial object detection model layer by using each marked sample image set to obtain the object detection model, the method further includes: obtaining at least one target feature map and at least one confidence level of at least one object corresponding to the at least one target feature map that are output from the initial object detection model when at least one sample image in each marked sample image set is input to the initial object detection model to perform object detection, the at least one sample image in the marked sample image set and the at least one target feature map being in a one-to-one correspondence, a target feature map being a last-layer feature map extracted from a corresponding sample image by the initial object detection model; and the method further includes: for the at least one sample image in the marked sample image set, determining that at least one object of at least one object type in each sample image are at least one positive sample corresponding to the sample image, and determining a negative sample corresponding to the sample image within a preset range centered on an object of at least one object type in the sample image; adopting a preset loss function to obtain a loss value corresponding to each marked sample image set according to at least one positive sample and at least one negative sample that correspond to the at least one sample image, and the at least one target feature map and the at least one confidence level of the at least one object corresponding to the at least one target feature map that are output from the initial object detection model; and adopting a stochastic gradient descent manner to update the object detection model according to the loss value corresponding to each marked sample image set.

In some other embodiments, during training the first-layer feature extraction network, the second-layer feature extraction network and the network layer having the same training identifier as the marked sample image set of the initial object detection model layer by using each marked sample image set to obtain the object detection model, the method further includes: obtaining at least one target feature map, confidence levels of pixels in the at least one target feature map and at least one confidence level of at least one object corresponding to the at least one target feature map that are output from the initial object detection model when at least one sample image in each marked sample image set is input to the initial object detection model to perform object detection; the method further includes: for the at least one sample image in the marked sample image set, determining that at least one object of at least one object type in each sample image are at least one positive sample corresponding to the sample image; determining a maximum confidence level in confidence levels of pixels included in a first region of a target feature map corresponding to the sample image, the first region being a region of the target feature map in which the at least one object of at least one object type in the sample image are located; excluding pixels included in other region of the target feature map except the first region, differences between confidence levels of the pixels in the other region and the maximum confidence level being less than a preset confidence threshold; determining at least one negative sample corresponding to the target feature map from the region in which excluded pixels are located; determining a corresponding region of the sample image to which the at least one negative sample corresponding to the target feature map is mapped, and at least one negative sample corresponding to the sample image in the corresponding region; adopting a preset loss function to obtain a loss value corresponding to each marked sample image set according to at least one positive sample and at least one negative sample that correspond to the at least one sample image, and the at least one target feature map and the at least one confidence level of the at least one object corresponding to the at least one target feature map that are output from the initial object detection model; and adopting a stochastic gradient descent manner to update the object detection model according to the loss value corresponding to the marked sample image set.

The at least one sample image in the marked sample image set and the at least one target feature map are in a one-to-one correspondence. A target feature map is a last-layer feature map extracted from a corresponding sample image by the initial object detection model.

In another aspect, an object detection method is provided, the method comprising: first obtaining an image to be detected; then, inputting the image to be detected to an object detection model, and detecting objects of N object types to obtain at least one object and at least one position corresponding to the at least one object that are included in the image to be detected.

At least one object type of the at least one object belonging to the N object types. The object detection model is the object detection model trained by the method for training the object detection model as described in any one of the above embodiments.

In yet another aspect, an apparatus for training an object detection model is provided, the apparatus includes a memory and a processor. The memory is coupled to the processor; the memory is used for storing computer program codes, and the computer program codes include computer instructions. The processor causes, when executing the computer instructions, the apparatus to perform the method for training the object detection model as described in any one of the above embodiments.

In yet another aspect, an object detection apparatus is provided, the object detection apparatus includes a memory and a processor. The memory is coupled to the processor; the memory is used for storing computer program codes, and the computer program codes include computer instructions. The processor causes, when executing the computer instructions, the apparatus to perform the object detection method as described in any one of the above embodiments.

In yet another aspect, a non-transitory computer-readable storage medium is provided. The computer-readable storage medium has stored thereon a computer program that, when executed on an apparatus for training an object detection model, causes the apparatus for training the object detection model to perform the method for training the object detection model according to any one of the above embodiments; or, when executed on an object detection apparatus, causes the object detection apparatus to perform the object detection method as described in any one of the above embodiments.

BRIEF DESCRIPTION OF THE DRAWINGS

In order to describe technical solutions in the present disclosure more clearly, the accompanying drawings to be used in some embodiments of the present disclosure will be introduced briefly below. However, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
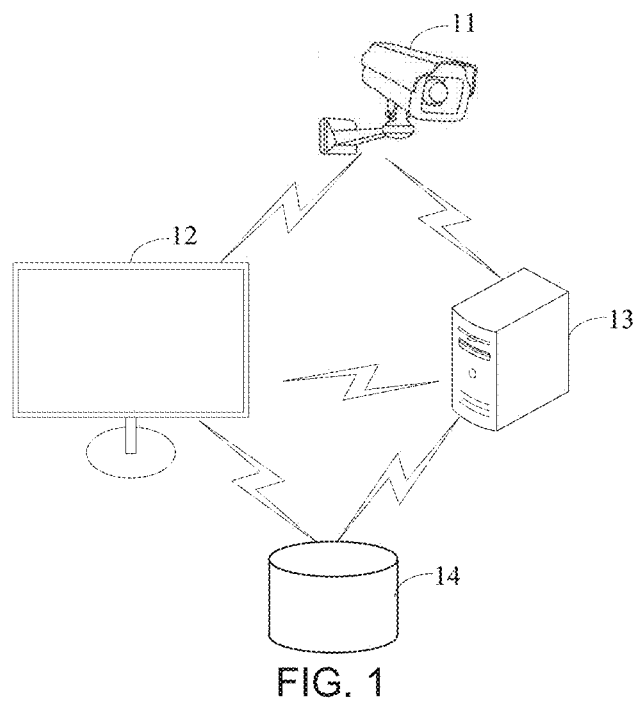
FIG. 1 is a structural diagram of an object detection system, in accordance with some embodiments.

Technical solutions in some embodiments of the present disclosure will be described clearly and completely below with reference to the accompanying drawings. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are interpreted as open and inclusive meaning, i.e., "including, but not limited to". In the description of the specification, the term such as "an embodiment", "some embodiments", "exemplary embodiments", "example", "specific example"

or "some examples" are intended to indicate that specific features, structures, materials or characteristics related to the embodiment(s) or example(s) are included in at least one embodiment or example of the present disclosure. Schematic representation of the above term does not necessarily refer to the same embodiment(s) or examples(s). In addition, the specific features, structures, materials or characteristics may be included in any one or more embodiments or examples in any suitable manner.

Hereinafter, the terms "first" and "second" are used for descriptive purposes only, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the terms "a plurality of", "the plurality of" and "multiple" each mean two or more unless otherwise specified.

In the description of some embodiments, terms such as "coupled" and "connected" and derivatives thereof may be used. For example, the term "connected" may be used in the description of some embodiments to indicate that two or more components are in direct physical or electrical contact with each other. As another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "A and/or B" includes the following three combinations: only A, only B, and a combination of A and B.

As used herein, depending on the context, the term "if" is optionally construed as "when", "in a case where", "in response to determining" or "in response to detecting". Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

In addition, the phrase "based on" or "according to" used is meant to be open and inclusive, since a process, step, calculation or other action that is "based on" or "according to" one or more of the stated conditions or values may, in practice, be based on additional conditions or values exceeding those stated.

The object detection technology has been used in more and more fields such as vehicle assisted driving, intelligent monitoring, intelligent robot, etc. In the related art, in a case where objects of N object types in an image are required to be detected, some sample images are firstly obtained from an open source database, and object(s) of one object type or objects of multiple object types in each sample image have been marked; then, the sample images are manually marked, so that the objects of N object types in each manually marked sample image are marked; and next, a certain detection network is trained by using the manually marked sample images, so as to obtain an object detection model, which may be used to detect the objects of N object types in the image.

Objects of only part of the N object types may be usually marked in the sample image obtained from the open source database, not the objects of N object types in the sample image are marked. Therefore, there is a need to manually mark the sample images to obtain sample images for training in which the objects of N object types are marked, so as to obtain the object detection model. In this case, labor costs for training the model are increased, the difficulty of training the model is increased, and the speed of training the model is reduced.

For technical solutions provided in embodiments of the present disclosure, an object detection model can be obtained through training without manually marking images, and the object detection model is used for detecting the objects of N object types in the image. Thus, the difficulty of training the model is reduced, which improves the speed of training the model.

A method for training the object detection model and an object detection method provided in embodiments of the present disclosure may be applied to an object detection system. FIG. 1 is a structural diagram of the object detection system, in accordance with some embodiments. As shown in FIG. 1, the object detection system 10 provided in embodiments of the present disclosure includes a multimedia acquisition device 11, a terminal 12, a server 13, and an open source database 14. The multimedia acquisition device 11 is connected to the terminal 12 and the server 13. The terminal 12 may be connected to the server 13. The terminal 12 and the server 13 are both connected to the open source database 14.

The multimedia acquisition device 11 may be an image acquisition device, e.g., a camera. The terminal 12 may be an electronic device including a display module, such as a mobile phone, a personal computer (PC), a notebook computer, a virtual reality terminal, an augmented reality terminal, or a wireless terminal in unmanned vehicle. For example, the terminal 12 in FIG. 1 is the PC.

The open source database 14 is used for storing images. Object(s) of one object type or objects of multiple object types in any image stored in the open source database 14 are usually marked, and it is unnecessary for the objects of N object types in any image to be marked.

In practical applications, the server 13 may be integrated in the terminal 12, or may be separately arranged from the terminal 12. Unless otherwise specified, the following content in embodiments of the present disclosure are all described in an example where the server 13 and the terminal 12 are devices that are separate from each other.

Principles of the method for training the object detection model and the object detection method provided in the embodiments of the present disclosure will be described with reference to FIG. 1.

Figure 2:
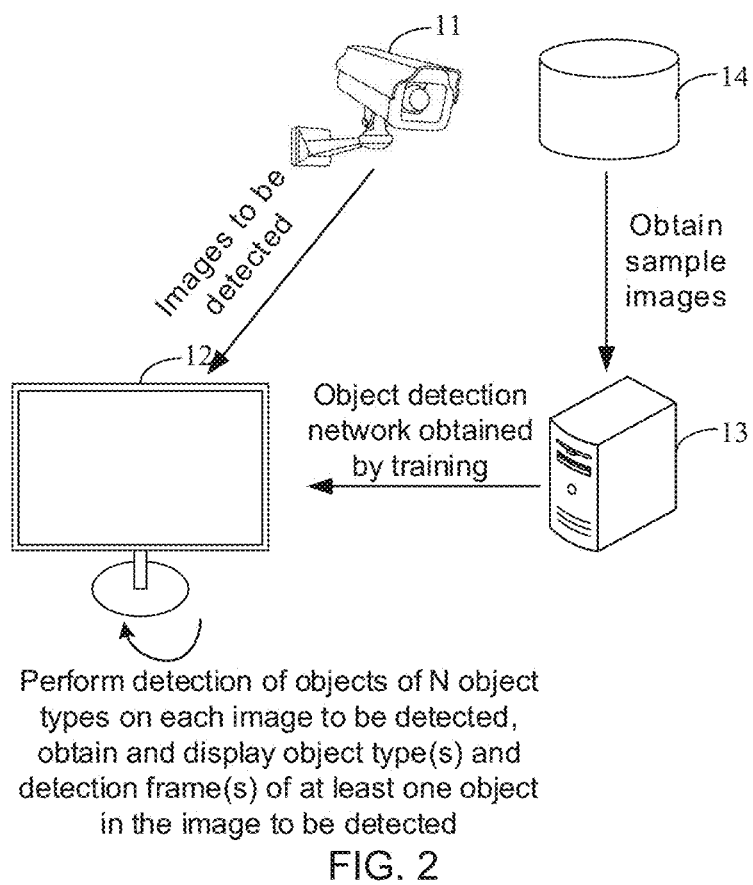
FIG. 2 is a flow diagram showing an object detection system performing a method for training an object detection model and an object detection method, in accordance with some embodiments.

As shown in FIG. 2, in a possible implementation, the server 13 may obtain some sample images from the open source database 14, object(s) of at least one object type in any sample image being marked. For example, an object type and a detection frame of each object in any sample image are marked. The total number of object types marked in all the obtained sample images is equal to N. Afterwards, the server 13 may train a neural network by using all the obtained sample images to obtain the object detection model, and send the object detection model to the terminal 12.

Then, the multimedia acquisition device 11 acquires an image to be detected, and sends the image to be detected to the terminal 12. After receiving the image to be detected, the terminal 12 performs detection of the objects of N object types on the image to be detected by using the object detection model, so as to obtain at least one object in the image to be detected. The at least one object may include object type(s) and position(s) of the at least one object. The terminal 12 may display the object type(s) and detection frame(s) of the at least one object in the image to be detected.

The server 13 may further update the object detection model according to a preset training period or other update condition, and send the updated object detection model to the terminal 12, and the terminal 12 may perform the detection of the objects of N object types on an image to be detected that is received subsequently by using the updated object detection model.

The objects of N object types may include human, animal, vehicle, and object of other object type.

It will be noted that, in addition to receiving the object detection model from the server 13, the terminal 12 may also obtain the object detection model through training. For a specific process of the terminal 12 obtaining the object detection model through training, reference may be made to the detailed description of the server 13 training the object detection model, which will not be repeated here.

Figure 3:
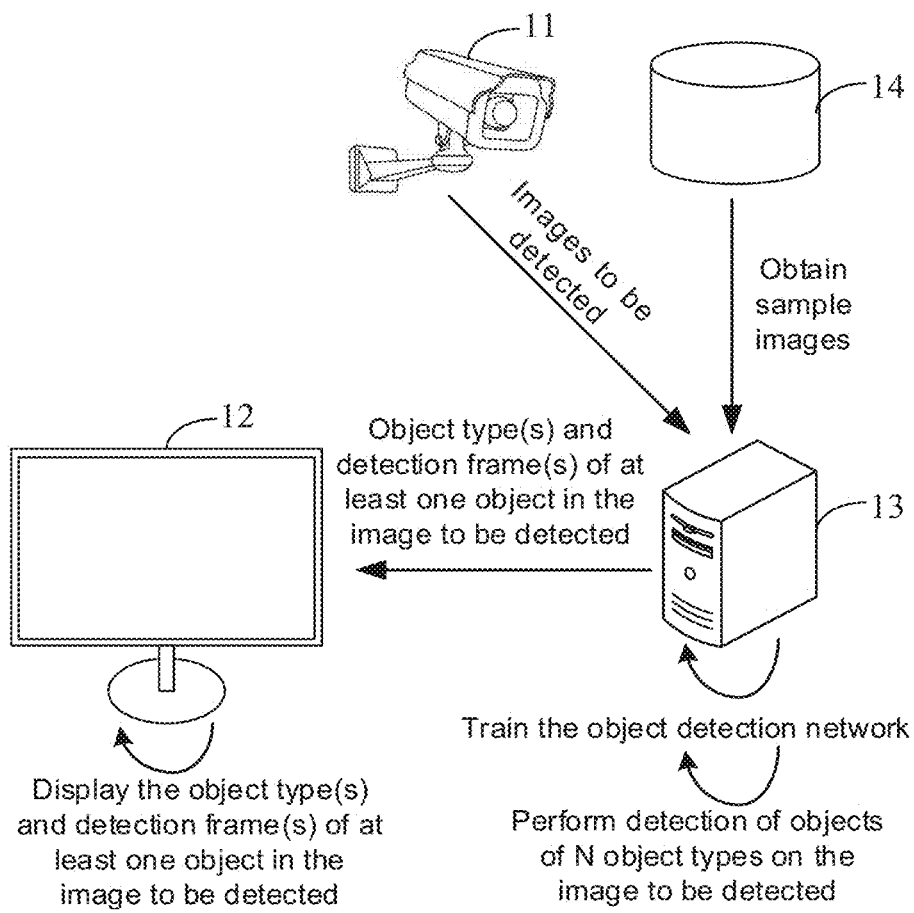
FIG. 3 is another flow diagram showing an object detection system performing a method for training an object detection model and an object detection method, in accordance with some embodiments.

As shown in FIG. 3, in another possible implementation, the server 13 may train the neural network by using all the obtained sample images to obtain the object detection model. Then, the server 13 receives the image to be detected acquired by the multimedia acquisition device 11. The server 13 performs the detection of the objects of N object types on the image to be detected by using the object detection model, so as to obtain the at least one object in the image to be detected, and the server 13 sends the at least one object in the image to be detected to the terminal 12. The at least one object may include the object type(s) and position(s) of the at least one object. The terminal 12 displays the object type(s) and the detection frame(s) of the at least one object in the image to be detected.

An executive body of the method for training the object detection model provided in the embodiments of the present disclosure may be an apparatus for training the object detection model, or may be a functional module and/or a function entity capable of implementing the method for training the object detection model in the apparatus for training the object detection model. The executive body may be specifically determined according to actual usage requirements, which is not limited in the embodiments of the present disclosure. In addition, an executive body of the object detection method provided in the embodiments of the present disclosure may be an object detection apparatus, or may be a functional module and/or a functional entity capable of implementing the object detection method in the object detection apparatus, which may be specifically determined according to actual usage requirements, and is not limited in the embodiments of the present disclosure.

The object detection apparatus and the apparatus for training the object detection model in the embodiments of the present disclosure each may be the terminal 12 in the object detection system 10, or may be the server 13 in the object detection system 10. In the case where the server 13 is integrated in the terminal 12, the object detection apparatus and the apparatus for training the object detection model each may also be the terminal 12 integrated with the server 13. In the following embodiments, specific processes of the object detection method and the method for training the object detection model are described by taking an example where the terminal performs the object detection method and the method for training the object detection model.

It will be noted that the number of devices (e.g., the multimedia acquisition device, the terminal, and the server) in any one of FIGS. 1 to 3 is merely illustrative, and the embodiments of the present disclosure do not limit the number of the devices in the object detection system.

In the embodiments of the present disclosure, usually the objects of N object types may not all be marked in each of the obtained sample images. In order to avoid the process of manually marking the sample images, the terminal may modify a conventional object detection model and use the modified object detection model as an initial object detection model. Then, the terminal trains the initial object detection model by using the sample images, so as to obtain the object detection model.

Figure 4:
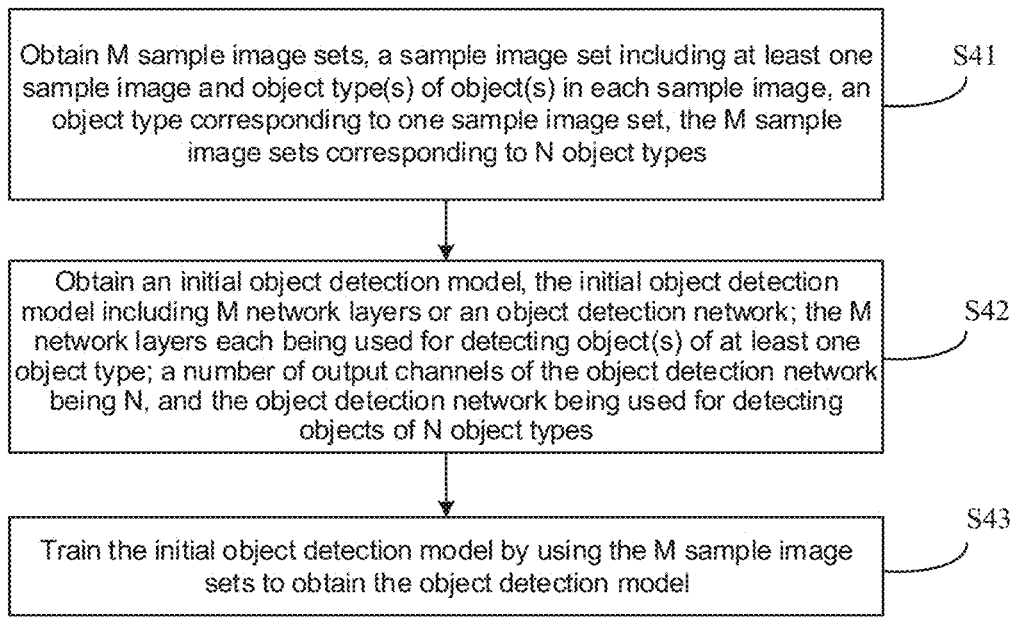
FIG. 4 is a flow diagram showing a method for training an object detection model, in accordance with some embodiments.

As shown in FIG. 4, the method for training the object detection model provided in the embodiments of the present disclosure may include S41 to S44.

In S41, M sample image sets are obtained. Each sample image set includes at least one sample image and object type(s) of object(s) in each sample image. An object type corresponds to one sample image set. The M sample image sets correspond to N object types.

M is a positive integer less than or equal to N, and N is a positive integer greater than 1.

In the embodiments of the present disclosure, one object type corresponds to only one sample image set, but one sample image set may correspond to one or more object types.

For example, it is assumed that, M is equal to 2 (i.e., M=2), and N is equal to 3 (i.e., N=3), the M sample image sets include a first sample image set and a second sample image set, and the N object types include an object type A, an object type B and an object type C. All sample images in the first sample image set include objects of the object type A and objects of the object type B. All sample images in the second sample image set include objects of the object type C.

In the embodiments of the present disclosure, the object type(s) and position(s) of at least one object in each sample image are marked. A position of an object may include coordinates of a detection frame in an image to which the object belongs, and the detection frame is used for indicating a region in which the object is located in the image. The detection frame may be a box.

In some embodiments, the terminal may obtain the M sample image sets from the open source database.

In S42, the initial object detection model is obtained. The initial object detection model includes M network layers or an object detection network. The M network layers each are used for detecting object(s) of at least one object type. The number of output channels of the object detection network is N, and the object detection network is used for detecting the objects of N object types.

In the embodiments of the present disclosure, the terminal may modify a conventional object detection model to obtain the initial object detection model.

In an embodiment, the conventional object detection model may be a model including a detection output network (which may be referred to as a first model). The detection output network is used for detecting the object(s) of at least one object type. Further, the detection output network is used for detecting the object(s) of at least one object type, obtain and output an object type, a position and a confidence level of each detected object. The confidence level of the object represents credibility of the object type and position of the object. The confidence level may be in a range of 0 to 1, inclusive.

For example, the first model may be a network model generated based on an anchor manner. The network model generated based on the anchor manner may include YOLOv5.

In another embodiment, the conventional object detection model may be a model including an object detection network and an object position detection network (which may be referred to as a second model), and the object detection network and the object position detection network may be connected in parallel. The object detection network is used for detecting the object(s) of at least one object type, and obtaining and outputting the object type of each detected object. The object position detection network is used for detecting the object(s) of at least one object type, and obtaining and outputting the position of each detected object.

For example, the second model may be a network model generated based on an anchor-free manner. The network model generated based on the anchor-free manner may include: DenseBox, YOLO, CornerNet or ExtremeNet.

Further, the terminal may modify the first model or the second model to obtain the initial object detection model. The initial object detection model obtained by the terminal through modifying the first model may include the M network layers. The initial object detection model obtained by the terminal through modifying the second model may include the object detection network. The terminal makes different modifications on the first model and the second model.

In S43, the initial object detection model is trained by using the M sample image sets to obtain the object detection model.

In the case where the initial object detection model includes the M network layers, the terminal may use each sample image set to train a network layer in the M network layers. Different sample image sets are used to train different network layers. In the case where the initial object detection model includes the object detection network, the terminal may use the M sample image sets to train the initial object detection model.

It will be understood that, one object type corresponds to one sample image set, but one sample image set may correspond to one or more object types; and the sample image set includes the at least one sample image and the object type(s) of object(s) in each sample image. Thus, it can be known that, the object type(s) of object(s) in the sample image in the sample image set include one object type or multiple object types. That is, the sample image in the sample image set may include object(s) of one object type or objects of multiple object types. In this way, the terminal trains the initial object detection model by using the M sample image sets, which means that the terminal trains the initial object detection model by using the sample images each including the object(s) of one object type or the objects of multiple object types. The terminal does not need to use sample images each including the objects of N object types to train the initial object detection model, thereby avoiding manually marking the images. As a result, the difficulty of training the model is reduced, which improves the speed of training the model.

In addition, the initial object detection model may include the M network layers, and the M network layers each are used for detecting the object(s) of at least one object type. Thus, the terminal may train the M network layers of the initial object detection model by using the M sample image sets. Since the M sample image sets correspond to the N object types, the terminal may detect the objects of N object types by using the M network layers that are trained by using the M sample image sets.

The initial object detection model may include the object detection network, the object detection network is used for detecting the objects of N object types, and the M sample image sets correspond to the N object types. Thus, the terminal may train the initial object detection model including the object detection network by using the M sample image sets, so as to obtain the object detection model for detecting the objects of N object types.

In summary, the terminal can obtain the object detection model through training without manually marking the images, and the object detection model can detect the objects of N object types.

Figure 5:
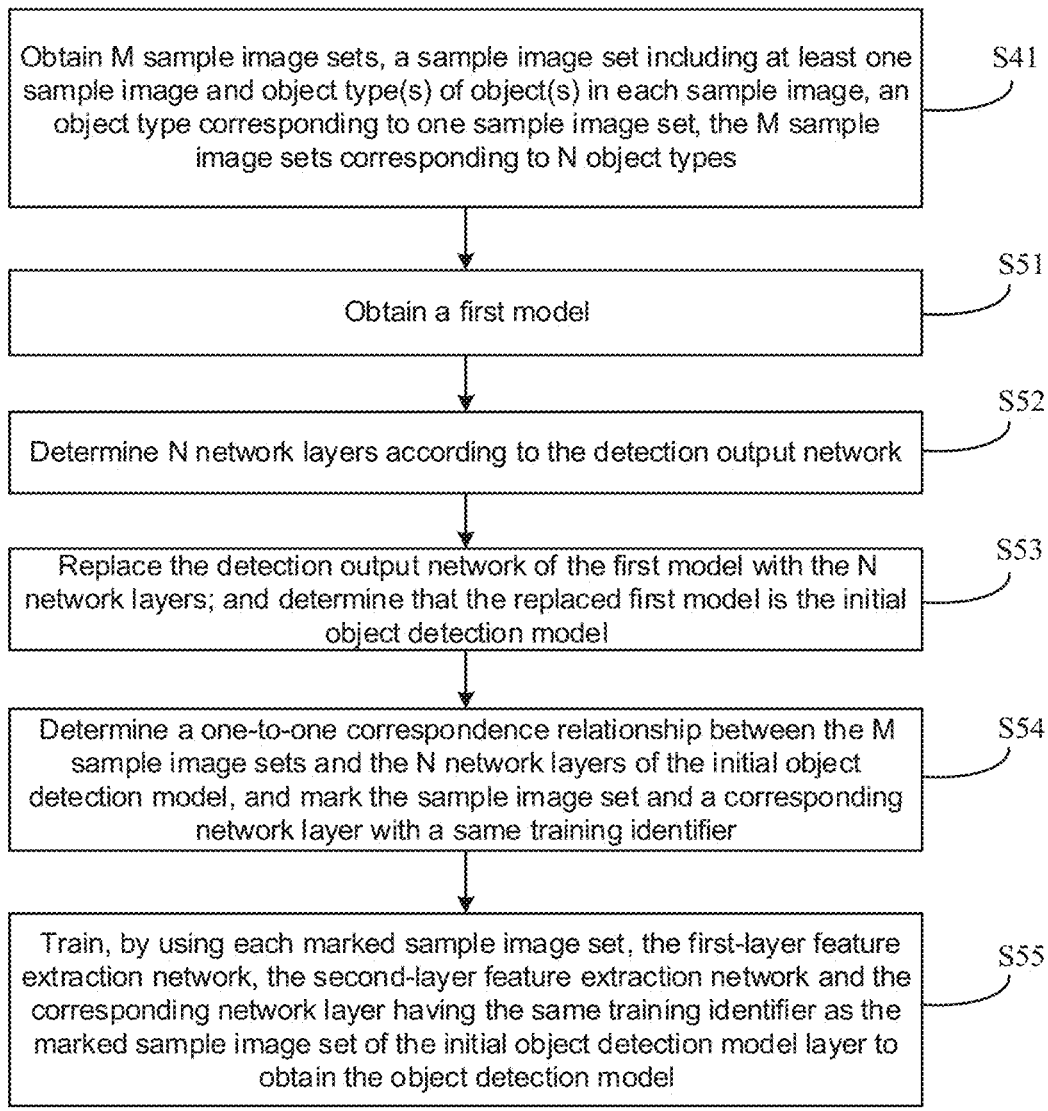
FIG. 5 is another flow diagram showing a method for training an object detection model, in accordance with some embodiments.

In embodiments of the present disclosure, the terminal may modify the first model to obtain the initial object detection model. As shown in FIG. 5, S42 in the method for training the object detection model may include S51 to S53.

In S51, the first model is obtained.

The first model includes a first-layer feature extraction network, a second-layer feature extraction network and a detection output network. The first-layer feature extraction network is capable of extracting a feature map from an input of the first model to obtain a first-layer feature map. The second-layer feature extraction network is capable of performing feature fusion on the first-layer feature map to obtain a second-layer feature map. The detection output network is capable of detecting object(s) and position(s) corresponding to the object(s) in the second-layer feature map.

The input of the first model is an input of the first-layer feature extraction network. The first-layer feature extraction network is connected to the second-layer feature extraction network. The second-layer feature extraction network is connected to the detection output network. An output of the detection output network is an output of the first model.

Figure 6:
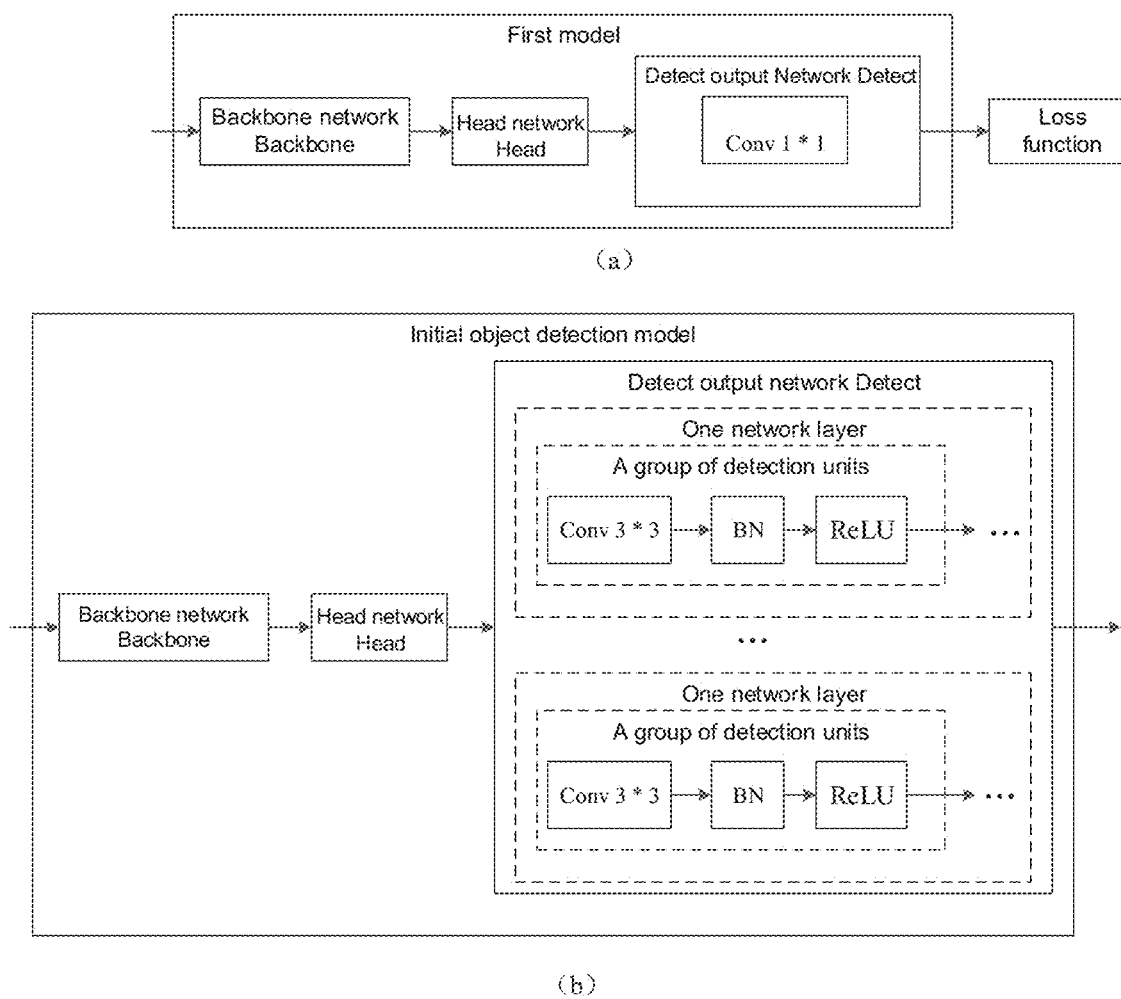
FIG. 6 are structural diagrams of a first model and an initial object detection model, in accordance with some embodiments.

In an example where the first model is a YOLOv5 model, as shown in (a) of FIG. 6, the YOLOv5 model may include: a backbone network Backbone, a head network Head and a detection output network Detect. The backbone network is used for extracting semantic feature information (e.g., a feature map) of the object(s) of at least one object type in the image. The head network is used for fusing multi-level semantic feature information (e.g., the feature map) output from the backbone network. The detection output network is used for extracting object type(s), coordinates of detection frame(s) and confidence level(s) of the at least one object from a feature map output from the head network.

In the case where the first model is the YOLOv5 model, the first-layer feature extraction network of the first model is the backbone network Backbone, the second-layer feature extraction network of the first model is the head network Head, and the detection output network of the first model is the detection output network Detect.

The detection output network may include a convolution kernel. The convolution kernel may be in a size of 1×1. The detection frame may be a box. Coordinates of the box are (x, y, w, h), where W is a width of the box, h is a height of the box, and x and y are coordinates of a center of the box.

It will be noted that, in a case where the terminal adopts the above technologies to train the first model to obtain the object detection model, the number of output channels of the object detection model is (N+5). The N channels of the object detection model output the objects of N object types, and the five channels of the object detection model output the coordinates (x, y, w, h) of the boxes and the confidence levels.

In S52, N network layers are determined according to the detection output network.

The second-layer feature extraction network is connected to the N network layers, M is equal to N. Further, the N network layers are determined by the terminal, and thus M is determined to be equal to N. That is, N sample image sets are obtained by the terminal, and thus N may be determined to be equal to M.

In the embodiments of the present disclosure, the terminal may determine that the detection output network of the first model is a group of detection units, and then determine that each network layer in the N network layers includes at least one group of detection units.

Alternatively, the terminal may modify the detection output network of the first model to obtain the group of detection units, and then determine that each network layer in the N network layers includes the at least one group of detection units.

The number K of groups of detection units included in each network layer is one, two or three.

It will be understood that, the terminal may control a depth of the feature map extracted by the initial object detection model through the number of groups of detection units included in each network layer. The larger the number of the groups, the deeper the feature map may be extracted by the initial object detection model. However, in order to avoid the problem of over-fitting, an appropriate number of the groups may be set, such as 2 or 3.

In the embodiments of the present disclosure, in a case where the detection output network of the first model includes a convolution layer, the terminal may modify the size of the convolution kernel of the convolution layer, and determine that the modified convolution layer, a batch normalization (BN) layer and a rectified linear unit (ReLU) constitute the group of detection units.

Alternatively, in the case where the detection output network includes the convolutional layer, the terminal may determine that the convolutional layer, the BN layer and the ReLU constitute the group of detection units.

A size of the modified convolution kernel is 3×3, 5×5, or 7×7. In the group of detection units, the modified convolution layer or the convolutional layer is connected to the BN layer, and the BN layer is connected to the ReLU.

It will be understood that, the terminal may add the BN layer and the ReLU to the group of detection units, so that the group of detection units can extract a feature map from an object in the image, and the feature map may better represent the object.

In S53, the detection output network of the first model is replaced with the N network layers, and the first model whose detection output network is replaced is determined to be the initial object detection model.

Still in the example where the first model is the YOLOv5 model, the terminal may modify the size of the convolution kernel of the convolutional layer of the detection output network of the first model to be 3×3, and then determine the modified convolution layer, the BN layer and the ReLU constitute the group of detection units. Next, the terminal determines that each network layer in the N network layers includes K groups of detection units. Finally, the terminal replaces the detection output network of the first model with the N network layers to obtain the initial object detection model.

As shown in (b) of FIG. 6, the initial object detection model includes the N network layers, and each network layer includes the K groups of detection units. The group of detection units includes the convolutional layer, the BN layer and the ReLU, and the size of the convolution kernel of the convolutional layer is 3×3.

Further, in the case where the initial object detection model obtained by the terminal includes the N network layers, M is equal to N (M=N). Thus, the M sample image sets obtained by the terminal are the N sample image sets. The terminal may use each sample image set in the N sample image sets to train a respective network layer in the N network layers of the initial object detection model. Different network layers are trained by using different sample image sets.

As shown in FIG. 5, S43 in the method for training the object detection model may include S54 to S55.

In S54, a one-to-one correspondence relationship is determined between the M sample image sets and the N network layers of the initial object detection model, and a sample image set and a corresponding network layer are marked with a same training identifier.

A training identifier is used to mark one sample image set and one network layer. The M sample image sets are the N sample image sets.

In some embodiments, on a premise that different network layers correspond to different sample image sets, the terminal may randomly designate the corresponding network layer for each sample image set. Then, the terminal may mark the sample image set and the corresponding network layer with the same training identifier, so as to control the sample image set to be used for training the corresponding network layer.

The training identifier may be number, letter, symbol, or the like.

For example, the terminal may respectively mark the N sample image sets with numbers in $\{0, 1, 2, \ldots, N-1\}$, and respectively mark the N network layers with the numbers in $\{0, 1, 2, \ldots, N-1\}$. The sample image set and the corresponding network layer are marked with the same number.

In S55, by using each marked sample image set, the first-layer feature extraction network, the second-layer feature extraction network and the corresponding network layer having the same training identifier as the marked sample image set of the initial object detection model are trained to obtain the object detection model.

The terminal may input N marked sample image sets to the initial object detection network in sequence, and by using each marked sample image set, the terminal trains the first-layer feature extraction network, the second-layer feature extraction network, and the network layer having the same training identifier as the marked sample image set of the initial object detection model.

It will be noted that, in a case where the number of output channels of each network layer of the object detection model that is obtained by the terminal adopting S51 to S55 is 5. The five channels of each network layer output the box coordinates (x, y, w, h) of objects of one object type and the confidence levels of the objects.

Further, while training the initial object detection model by performing S54 to S55, the terminal may obtain the output of the initial object detection model in a case where the terminal inputs a sample image to the initial object detection model to perform object detection. Thus, a loss value of the output of the initial object detection model is calculated by using a preset loss function. The object detection model obtained after training continues to be updated according to the loss value.

During S55, in a case where at least one sample image in each marked sample image set is input to the initial object detection model to perform object detection, the terminal may obtain objects in the at least one sample image output from the initial object detection model. Then, according to objects of at least one object type in the at least one sample image and the objects in the at least one sample image output from the initial object detection model, the terminal adopts the preset loss function to obtain an average loss value corresponding to each marked sample image set. Finally, according to the average loss value corresponding to each marked sample image set, the terminal adopts a stochastic gradient descent manner to update the object detection model (that is, the object detection model is optimized).

The terminal may update parameters (e.g., weight and bias) of the object detection model to improve an accuracy of the object detection model.

The terminal may obtain an overall average value by averaging M average loss values corresponding to the M marked sample image sets. Then, the terminal adopts the stochastic gradient descent manner to update the object detection model according to the overall average value.

It will be understood that, the terminal obtains the overall average value by averaging the M average loss values to update the object detection model, which is equivalent to using more sample images to train the object detection model at a time. That is, a batch size is larger. As a result, the model is optimized relatively faster and better.

It will be noted that, since the M sample image sets correspond to the N object types, and different sample image sets may correspond to completely different object types, for any one sample image set corresponding to at least one object type, the object(s) of at least one object type included in each sample image in the sample image set are positive sample(s), and other content(s) except the object(s) of at least one object type in the sample image are regarded as negative sample(s). The other content(s) may include object(s) of other object type except the at least one object type in the N object types. Therefore, in order to avoid objects belonging to the N object types from being considered as negative samples, the terminal may select the negative sample by using any one of the following two selection methods for calculating the loss value.

In a first selection method, the terminal may use the object(s) of at least one object type in each sample image as the positive sample(s), and select the negative sample within a preset range centered on the positive sample in the sample image.

For example, it is assumed that N is equal to three, and the three object types include the object type A, the object type B and the object type C. As shown in (a) of FIG. 7, each sample image marked manually includes objects of three object types, and object(s) of each object type may include at least one object. The objects of three object types in the sample image marked manually are positive samples.

Figure 7:
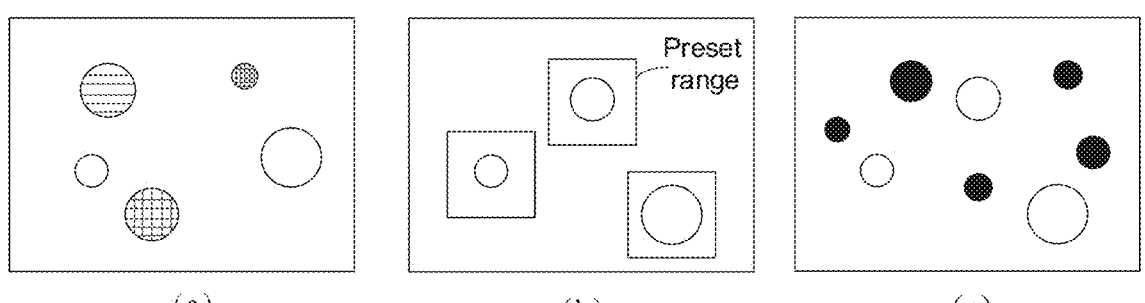
FIG. 7 are sample images each including objects of at least one object type, in accordance with some embodiments.

As shown in (b) of FIG. 7, the terminal obtains a sample image set corresponding to the object type A, and each sample image in the sample image set includes object(s) of object type A. The terminal determines that the object(s) of object type A in the sample image are the positive sample(s), and selects the negative sample within the preset range centered on the positive sample in each sample image.

It will be noted that a shape of the object in FIG. 7 is for illustration only, and the shape of the object is not limited.

During S55, in a case where at least one sample image in each marked sample image set is input to the initial object detection model to perform object detection, the terminal may obtain at least one target feature map and confidence level(s) of at least one object corresponding to the at least one target feature map that are output from the initial object detection model. The at least one sample image in the marked sample image set and the at least one target feature map are in a one-to-one correspondence. A target feature map is a last-layer feature map (or an intermediate-layer feature image) extracted from a corresponding sample image by the initial object detection model.

Then, for the at least one sample image in the marked sample image set, the terminal determines that the object(s) of at least one object type in each sample image are the positive sample(s) corresponding to the sample image, and determines negative sample(s) corresponding to the sample image within a preset range centered on the object of at least one object type in the sample image.

Finally, according to positive sample(s) and negative sample(s) that correspond to the at least one sample image, and the at least one target feature map and the confidence level(s) of the at least one object corresponding to the at least one target feature map that are output from the initial object detection model, the terminal may adopt the preset loss function (e.g., BCE Loss) to obtain the loss value corresponding to each marked sample image set. The terminal adopts the stochastic gradient descent manner to update the object detection model according to the loss value corresponding to each marked sample image set.

The preset range may be set according to human experience, or may be set for each object type. For example, for a human face, a corresponding preset range is set as 32 pixels. Preset ranges corresponding to different object types may be different. The preset range corresponding to each object type may be half an average width of the object of the object type.

In some embodiments, according to positive sample(s) and negative sample(s) that correspond to a sample image, and a target feature map corresponding to the sample image and confidence level(s) of at least one object corresponding to the target feature map that are output from the initial object detection model, the terminal may adopt the preset loss function to obtain the loss value corresponding to the sample image. Then, the terminal averages at least one loss value corresponding to the at least one sample image to obtain the loss value corresponding to each marked sample image set.

A region, in which any object corresponding to the target feature map is located, of the target feature map corresponds to a region of the sample image that belongs to a region where the positive sample corresponding to the sample image is located; thus, the object belongs to the positive sample. The region, in which any object corresponding to the target feature map is located, of the target feature map corresponds to a region of the sample image that belongs to a region where the negative sample corresponding to the sample image is located; thus, the object belongs to the negative sample. Therefore, the terminal may extract a confidence level of the positive sample and a confidence level of the negative sample from the confidence levels of the at least one object corresponding to the target feature map. Then the loss value (i.e., loss $(Map_i, C_i)$) corresponding to the sample image is obtained through calculating the target feature map $Map_i$, the confidence level $C_{zi}$ of the positive sample and the confidence level $C_{fi}$ of the negative sample by using a cross entropy loss function. The cross entropy loss function is shown in the following formula (1).

$$\text{loss}(\text{Map}_i, C_i) = -W_i[C_{zi} \log \text{Map}_i + (1-C_{fi})\log(\text{Map}_i)] \quad (1)$$

i represents an i-th sample image in the sample image set.

It will be noted that, in a case where the distribution of the objects of at least one object type in the sample image is relatively dense, the first selection method is not applicable.

In a second selection method, in a case where each sample image is input to the initial object detection model to perform object detection, the terminal may obtain a target feature map and confidence levels of pixels in the target feature map that are output from the initial detection model. Then, according to the confidence levels of the pixels in the target feature map, the terminal determines a negative sample corresponding to the target feature map. Next, the terminal maps a position and size of the negative sample corresponding to the target feature map to the sample image, and determines a negative sample corresponding to the sample image.

During S55, in a case where at least one sample image in each marked sample image set is input to the initial object detection model to perform object detection, the terminal may obtain at least one target feature map, confidence levels of pixels in the at least one target feature map and confidence level(s) of at least one object corresponding to the at least one target feature map that are output from the initial object detection model. The at least one sample image in the marked sample image set and the at least one target feature map are in a one-to-one correspondence. A target feature map is a last-layer feature map extracted from a corresponding sample image by the initial object detection model.

Then, the terminal determines that object(s) of at least one object type in each sample image in the marked sample image set are positive sample(s) corresponding to the sample image. The terminal determines a maximum confidence level in confidence levels of pixels included in a first region of a target feature map corresponding to the sample image, the first region being a region of the target feature map in which the object(s) of at least one object type in the sample image are located. For other region of the target feature map except the first region, the terminal excludes pixels included in the other region, differences between confidence levels of these pixels and the maximum confidence level being less than a preset confidence threshold; and the terminal determines negative sample(s) corresponding to the target feature map from the region in which excluded pixels are located. The terminal determines a corresponding region of the sample image to which the negative sample(s) corresponding to the target feature map is mapped, and determines negative sample(s) corresponding to the sample image in the corresponding region.

Finally, according to positive sample(s) and negative sample(s) that correspond to the at least one sample image, and the at least one target feature map and the confidence level(s) of the at least one object corresponding to the at least one target feature map that are output from the initial object detection model, the terminal obtains the loss value corresponding to each marked sample image set by using the preset loss function (e.g., the BCE Loss). The terminal adopts the stochastic gradient descent manner to update the object detection model according to the loss value corresponding to each marked sample image set.

The terminal may determine the corresponding region of the sample image to which the negative sample(s) corresponding to the target feature map is mapped by using a receptive field of deep learning.

For example, as shown in (c) of FIG. 7, the terminal obtains a target feature map output from the initial object detection model in a case where the sample image corresponding to the object type A is input to the initial object detection model to perform object detection. The target feature map includes the first region. The first region is a region, in which the object of the object type A in the sample image is located, of the target feature map. For the other region of the target feature map except the first region, the terminal excludes pixels included in the other region, and the differences between confidence levels of these pixels and the maximum confidence level are less than the preset confidence threshold; and the terminal determines the negative sample corresponding to the target feature map from the region in which excluded pixels are located.

In embodiments of the present disclosure, the terminal may obtain M first models. Then, the terminal uses each sample image set in the M sample image sets to train a respective one of the M first models. Finally, the terminal combines the M trained first models to obtain the initial object detection model.

Figure 8:
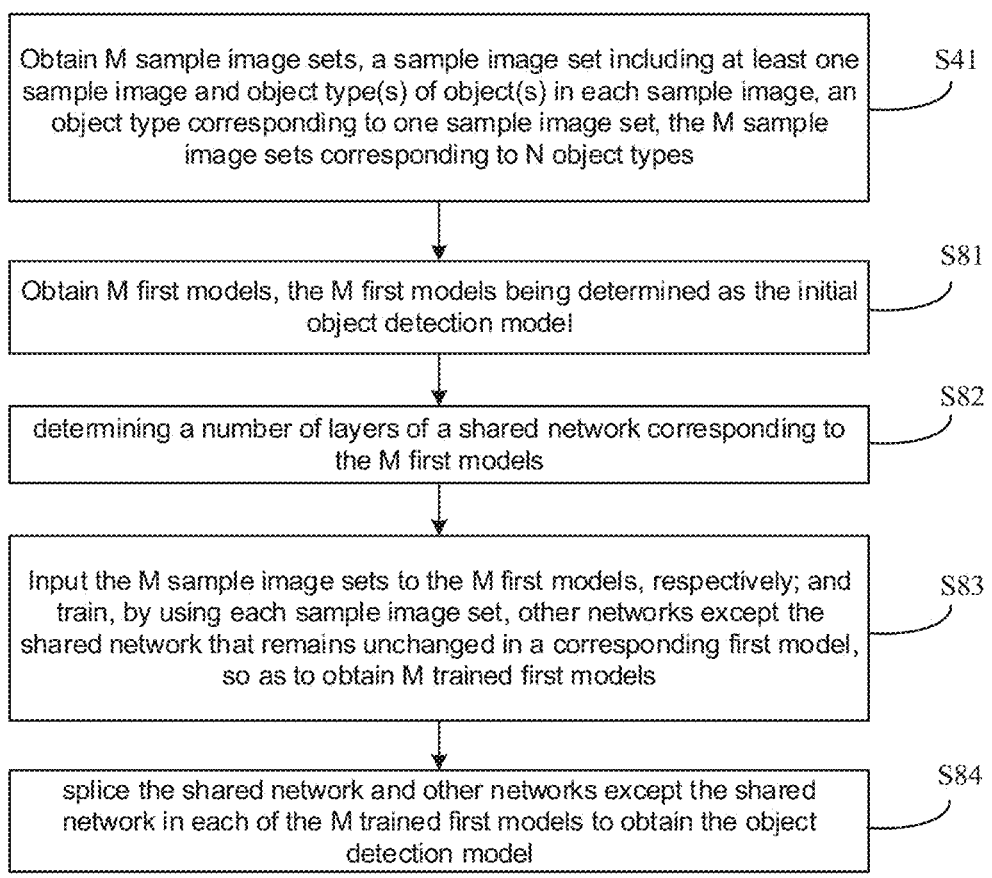
FIG. 8 is yet another flow diagram showing a method for training an object detection model, in accordance with some embodiments.

As shown in FIG. 8, in the method for training the object detection model, S42 may include S81, and S43 may include S82 to S84.

In S81, the M first models are obtained, and the M first models are determined as the initial object detection model.

The total number of sample image sets obtained by the terminal is equal to M, and thus the terminal also obtains the M first models.

It will be noted that, for a specific description of the first model in S81, reference may be made to the detailed description of the first model in S51, which is not repeated in the embodiments of the present disclosure here.

In S82, the number of layers of a shared network corresponding to the M first models is determined.

The number of layers of the shared network is set according to N and/or the total number of sample images included in the M sample image sets. Alternatively, the number of layers of the shared network is set according to a difficulty of detecting the objects of N object types.

The number of layers of the shared network is used for indicating that the first X networks in each first model remain unchanged in a training process of the M first models, X being the number of layers of the shared network.

In some embodiments, the greater the difficulty of detecting the objects of N object types, the less the number of layers of the shared network. The larger N is, the greater difficulty of detecting the objects of N object types. The smaller the total number of images included in the M sample image sets, the greater difficulty of detecting the objects of N object types.

For example, the terminal may determine the number of layers of the first-layer feature extraction network in the first model as the number of layers of the shared network. That is, first-layer feature extraction networks in the M first models remain unchanged in the training process of the M first models.

Figure 9:
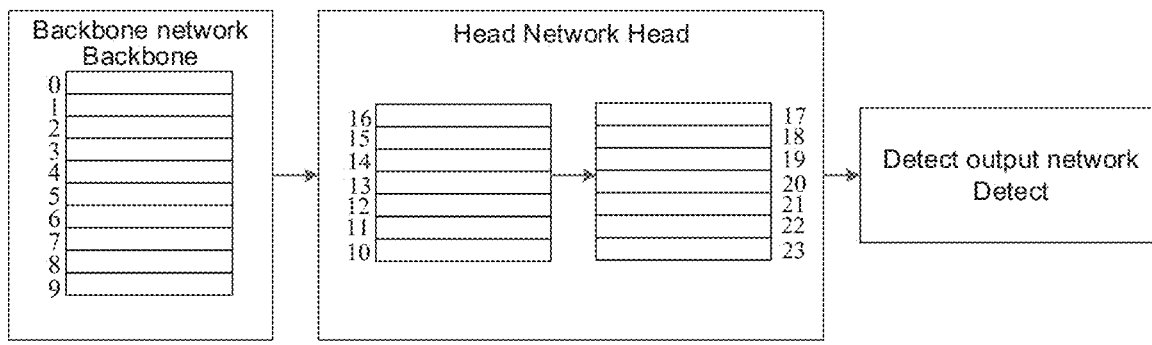
FIG. 9 is a structural diagram of a shared network of a first model, in accordance with some embodiments.

For example, as shown in FIG. 9, the first-layer feature extraction network included in the first model is the backbone network Backbone, and the second-layer feature extraction network included in the first model is the head network Head. The terminal may determine the number of layers of the shared network to be 10 or 15. In a case where the number of layers of the shared network is equal to 10, it means that the first ten networks (i.e., the ten networks constituting the first-layer feature extraction network) in each first model remain unchanged in the training process of the M first models.

In S83, the M sample image sets are respectively input to the M first models, and each sample image set is used to train other networks except the shared network in a corresponding first model. The shared network remains unchanged, and M trained first models are obtained.

The shared network is a network constituted by the first X networks in the first model, X being the number of layers of the shared network. Different sample image sets are used to train different first models.

For example, it is assumed that M is equal to 2 (M=2), and N is equal to 3 (N=3), the M sample image sets include the first sample image set and the second sample image set, and the N object types include the object type A, the object type B and the object type C. All sample images in the first sample image set include objects of the object type A and objects of the object type B. All sample images in the second sample image set include objects of the object type C.

Figure 10:
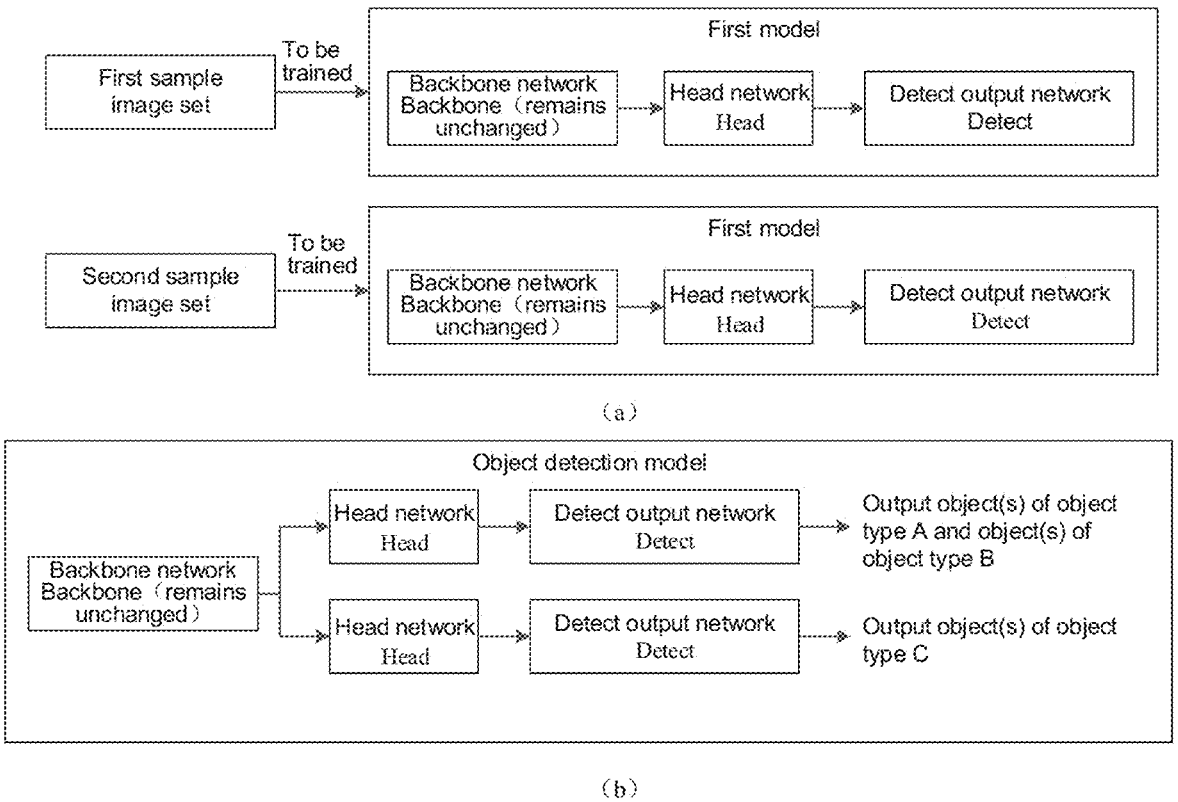
FIG. 10 are structural diagrams of another first model and another initial object detection model, in accordance with some embodiments.

As shown in (a) of FIG. 10, the terminal may determine that the shared networks of the two first models are the backbone networks Backbone. Then, the terminal trains the two first models by using the first sample image set and the second sample image set, respectively. During the training process, the backbone networks Backbone of the two first models remain unchanged. The first model trained using the first sample image set is capable of detecting the objects of the object type A and the object type B. The other first model trained using the second sample image set is capable of detecting the objects of the object type C.

In S84, the shared network and other networks except the shared network in each of the M trained first models are spliced to obtain the object detection model.

The M trained first models have the same shared network. The terminal may splice the shared network and the other networks determined from each of the M trained first models to obtain the object detection model.

In the object detection model, the shared network is connected to the other networks. The other networks may be connected in parallel.

For example, as shown in (b) of FIG. 10, the terminal may determine that the other networks except the backbone network Backbone of each trained first model are the head network Head and the detection output network Detect. Then, the terminal may connect a backbone network Backbone of the two trained first models to the head network Head and the detection output network Detect of one trained first model, and connect the backbone network Backbone of the two trained first models to the head network Head and the detection output network Detect of the other trained first model, so as to obtain the object detection model.

The detection output network Detect of one trained first model outputs the object type, position(s) and confidence level(s) of object(s) belonging to the object type A, and the object type, position(s) and confidence level(s) of object(s) belonging to the object type B. The detection output network Detect of the other trained first model outputs the object type, position(s) and confidence level(s) of object(s) belonging to of the object type C.

Further, while the terminal respectively inputs the M sample image sets to the M first models, and trains the other networks except the shared network of the corresponding first model by using each sample image set, the terminal may also obtain the output of each first model in a case where a corresponding sample image set is input to the first model to perform object detection. Thus, the loss value is calculated by using the preset loss function and the outputs of the initial object detection model. The trained first model is updated according to the loss value. Then, a new object detection model is formed by using the updated M first models.

It will be understood that, since the first model is a conventional object detection network, and the terminal uses each sample image set in the M sample image sets to train the corresponding first model, so as to obtain the trained first model. Therefore, in the process of training the M first models by the terminal, neither the model nor the training process needs to be modified. After the terminal obtains the M trained first models, the terminal only needs to combine the M trained first models, so that the object detection model is obtained. This method avoids modifying training codes, an implementation process is simple, and an implementation difficulty of model training is reduced.

Figure 11:
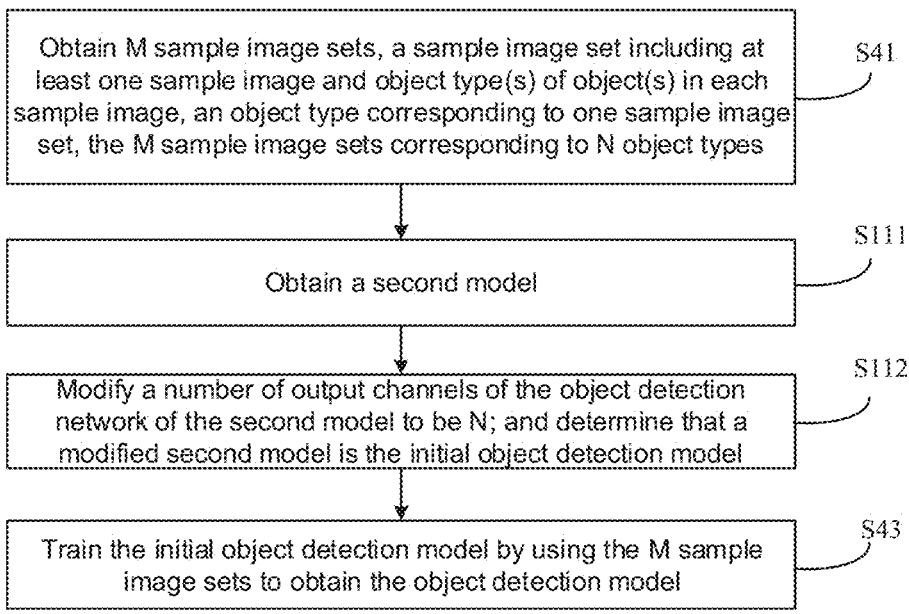
FIG. 11 is yet another flow diagram showing a method for training an object detection model, in accordance with some embodiments.

In embodiments of the present disclosure, the terminal may modify the second model to obtain the initial object detection model. As shown in FIG. 11, S42 in the method for training the object detection model may include S111 to S112.

In S111, the second model is obtained.

The second model includes: a down-sampling module, an up-sampling module, an object detection network and an object position detection network. The object detection network of the second model is used for detecting an object type of an object of at least one object type. The object position detection network is used for detecting a position of the object of at least one object type.

An input of the second model is an input of the down-sampling module. The down-sampling module is connected to the up-sampling module. The up-sampling module is connected to the object detection network and the object position detection network. An output of the second model includes an output of the object position detection network and an output of the object detection network.

In some embodiments, the object position detection network may include a height and width detection network and a center point detection network. The height and width detection network is used for detecting a height and width of the object of at least one object type, and the center point detection network is used for detecting a position of a center point of the object of at least one object type.

Figure 12:
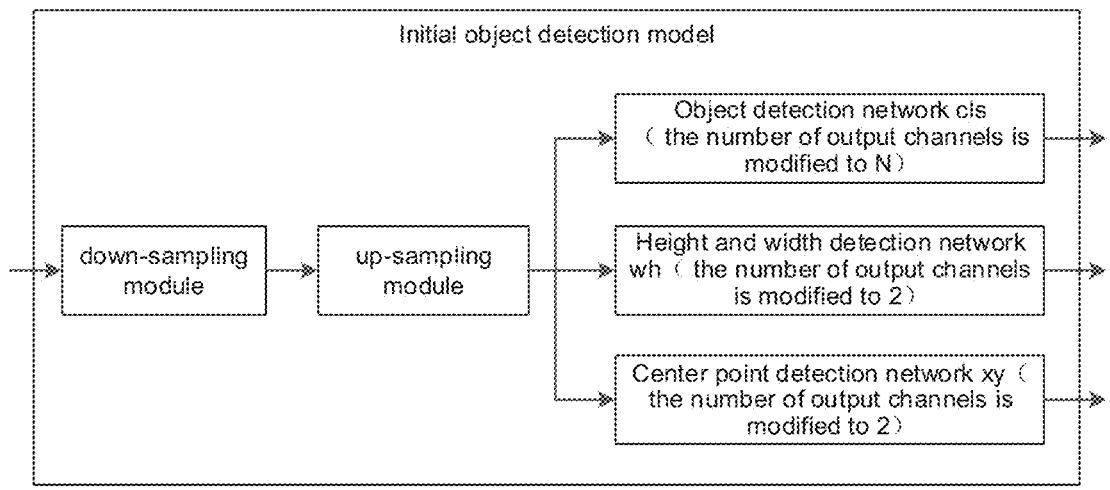
FIG. 12 is a structural diagram of an initial object detection model determined according to a second model, in accordance with some embodiments.

In an example where the second model is a CenterNet model, as shown in FIG. 12, the CenterNet model may include: the down-sampling module, the up-sampling module, the object detection network cls, the height and width detection network wh and the center point detection network xy. The number of output channels of each of the object detection network cls, the height and width detection network wh and the center point detection network xy is 64.

In S112, the number of output channels of the object detection network of the second model is modified to be N, and the modified second model is determined as the initial object detection model.

The object detection network of the modified second model includes N output channels. Each output channel is used for detecting an object of an object type.

In some embodiments, in addition to modifying the number of output channels of the object detection network of the second model to be N, the terminal may also modify the number of output channels of the high and width detection network of the second model to be 2, and modify the number of output channels of the center point detection network of the second model to be 2.

For example, with continued reference to FIG. 12, the terminal modifies the number of output channels of the object detection network cls of the CenterNet model to be N, modifies the number of output channels of the height and width detection network wh of the CenterNet model to be 2, and modifies the number of output channels of the center point detection network xy of the CenterNet model to be 2. The modified CenterNet model is the initial object detection model.

It will be understood that, in a case where there is a need to add another object type detected by the object detection model, the terminal only needs to obtain an sample image set corresponding to the newly added object type, and modify the number of the channels of the object detection network of the initial object detection model, and then retrains the initial object detection model. The number of the object types that can be recognized by the object detection model is modified, which requires a simple operation and is easy to be achieved. Therefore, the solution may flexibly adjust the number of the object types detected by the object detection model.

Further, while training the initial object detection model determined in S111 to S112, the terminal may also obtain the output of the initial object detection model in a case where a sample image is input to the initial object detection model to perform object detection. Thus, the loss value is calculated by using the preset loss function and the output of the initial object detection model. The trained object detection model continues to be updated according to the loss value.

In a case where at least one sample image in each sample image set is input to the initial object detection model to perform object detection, the terminal may obtain object(s) in the at least one sample image output by the initial object detection model. Then, according to the object(s) of at least one object type in the at least one sample image and the object(s) in the at least one sample image output by the initial object detection model, the terminal adopts the preset loss function (e.g., focal loss) to obtain an average loss value corresponding to each sample image set. Finally, the terminal adopts the stochastic gradient descent manner to update the object detection model according to the average loss values corresponding to the sample image set.

Figure 13:
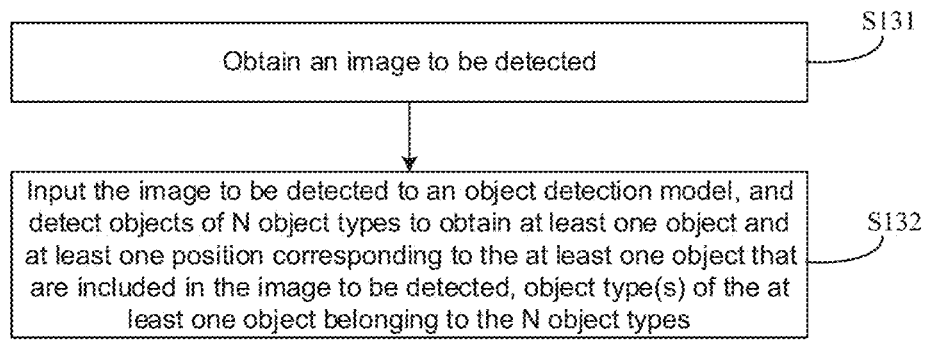
FIG. 13 is a flow diagram of an object detection method, in accordance with some embodiments.

Some embodiments of the present disclosure provide an object detection method. As shown in FIG. 13, the object detection method may include S131 to S132.

In S131, an image to be detected is obtained.

The terminal may receive the image to be detected acquired by a multimedia photographing device.

In S132, the image to be detected is input to the object detection model, objects of N object types are detected to obtain at least one object and at least one position corresponding to the at least one object included in the image to be detected, object type(s) of the at least one object belonging to the N object types.

The object detection model is the object detection model trained by using the method for training the object detection model.

The foregoing descriptions mainly introduce the solutions provided by the embodiments of the present disclosure from perspective of method. In order to achieve the above functions, corresponding hardware structures and/or software modules for performing various functions are included. A person skilled in the art will be easy to realize that, by combining units and algorithm steps of the examples described in the embodiments disclosed herein, the embodiments of the present disclosure can be implemented through hardware or a combination of hardware and computer software. Whether a certain function is performed by the hardware or a way of driving hardware by the computer software depends on a specific application and a design constraint of a technical scheme. A skilled person may use different methods for each specific application to implement the described functions, but such implementation should not be considered beyond the scope of the present disclosure.

Figure 14:
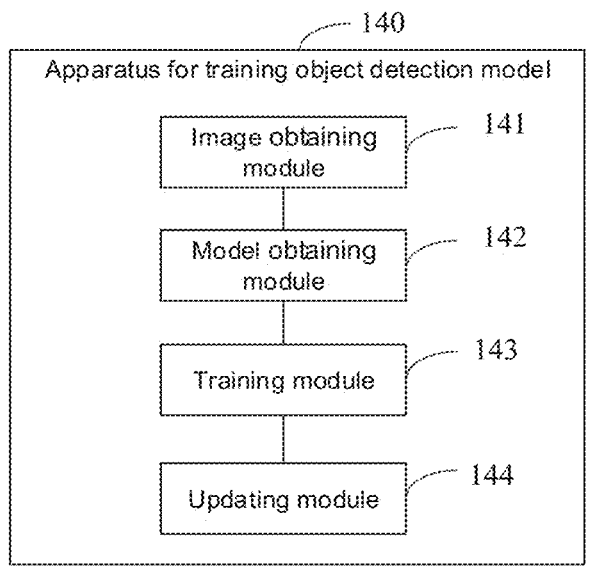
FIG. 14 is a structural diagram of an apparatus for training an object detection model, in accordance with some embodiments.

Some embodiments of the present disclosure further provide an apparatus for training an object detection model. FIG. 14 is a structural diagram of the apparatus for training the object detection model in accordance with embodiments of the present disclosure. The apparatus 140 for training the object detection model may include: an image obtaining module 141 for obtaining M sample image sets, a model obtaining module 142 for obtaining an initial object detection model, and a training module 143 for training the initial object detection model by using the M sample image sets to obtain the object detection model.

The sample image set includes at least one sample image and object type(s) of object(s) in each sample image. An object type corresponds to one sample image set. The M sample image sets correspond to N object types. M is a positive integer less than or equal to N, and N is an integer greater than 1. The initial object detection model includes M network layers or an object detection network. The M network layers each are used for detecting object(s) of at least one object type. The number of output channels of the object detection network is N, and the object detection network is used for detecting objects of N object types.

In some embodiments, the model obtaining module 142 is used to: obtain a first model; determine N network layers according to a detection output network of the first model; and replace the detection output network of the first model with the N network layers, and determine the modified first model to be the initial object detection model.

The first model includes a first-layer feature extraction network, a second-layer feature extraction network and the detection output network. The first-layer feature extraction network is capable of extracting a feature map from an input of the first model to obtain a first-layer feature map. The second-layer feature extraction network is capable of performing feature fusion on the first-layer feature map to obtain a second-layer feature map. The detection output network is capable of detecting object(s) and position(s) corresponding to the object(s) in the second-layer feature map. The second-layer feature extraction network is connected to the N network layers. M is equal to N.

In some other embodiments, the model obtaining module 142 is used to: determine a one-to-one correspondence relationship between the M sample image sets and the N network layers of the initial object detection model, and mark a sample image set and a network layer that are corresponded with a same training identifier, a training identifier being used for marking one sample image set and the corresponding network layer; and train, by using each marked sample image set, the first-layer feature extraction network, the second-layer feature extraction network and the corresponding network layer having the same training identifier as the marked sample image set of the initial object detection model layer, so as to obtain the object detection model.

In some other embodiments, the model obtaining module 142 is used to: determine that the detection output network is a group of detection units, and determine that each network layer in the N network layers includes at least one group of detection units; or modify the detection output network to obtain the group of detection units, and determine that each network layer in the N network layers includes the at least one group of detection units. The number of groups of detection units included in each network layer is one, two or three.

In some other embodiments, the model obtaining module 142 is used to: modify a size of a convolutional kernel of a convolutional layer in a case where the detection output network includes the convolutional layer, and determine that the modified convolution layer, a batch normalization (BN) layer and a rectified linear unit (ReLU) constitute the group of detection units; or determine that the convolutional layer, the BN layer and the ReLU constitute the group of detection units in a case where the detection output network includes the convolutional layer.

The size of the modified convolution kernel is 3×3, 5×5, or 7×7. In the group of detection units, the modified convolution layer or the convolution layer is connected to the BN layer, and the BN layer is connected to the ReLU.

In some other embodiments, the first model is a network model generated based on an anchor manner.

In some other embodiments, the model obtaining module 142 is used to: obtain a second model; modify the number of output channels of an object detection network of the second model to be N; and determine that a modified second model is the initial object detection model.

The second model includes: a down-sampling module, an up-sampling module, an object detection network and an object position detection network. The object detection network of the second model is used for detecting an object type of an object of at least one object type. The object position detection network is used for detecting a position of the object of at least one object type.

In some other embodiments, the object position detection network includes a height and width detection network and a center point detection network. The height and width detection network is used for detecting a height and width of the object of at least one object type. The center point detection network is used for detecting a position of a center point of the object of at least one object type.

The model obtaining module 142 is further used to: modify the number of output channels of the high and width detection network of the second model to be 2; and modify the number of output channels of the center point detection network of the second model to be 2.

In some other embodiments, the second model is a network model generated based on an anchor-free manner.

In some other embodiments, the model obtaining module 142 is used to: obtain M first models, and the M first models are determined as the initial object detection model. The first model includes a first-layer feature extraction network, a second-layer feature extraction network and a detection output network. The first-layer feature extraction network is capable of extracting a feature map from an input of the first model to obtain a first-layer feature map. The second-layer feature extraction network is capable of performing feature fusion on the first-layer feature map to obtain a second-layer feature map. The detection output network is capable of detecting object(s) and position(s) corresponding to the object(s) in the second-layer feature map.

In some other embodiments, the model obtaining module 142 is used to: determine the number of layers of a shared network corresponding to the M first models, the number of layers of the shared network being set according to at least one of N and the total number of sample images included in the M sample image sets; respectively input the M sample image sets to the M first models, and use each sample image set to train other networks except the shared network (which remains unchanged) in a corresponding first model, so as to obtain M trained first models, the shared network being a network constituted by first X networks in the first model and X being the number of layers of the shared network; and splice the shared network and other networks except the shared network in each of the M trained first models to obtain the object detection model, the shared network of the object detection model being connected to the other networks in each of the M trained first models.

In some other embodiments, the apparatus 140 further includes an updating module 144. The updating module 144 is used to: while the first-layer feature extraction network, the second-layer feature extraction network and the network layer having the same training identifier as the marked sample image set of the initial object detection model layer are trained by using each marked sample image set to obtain the object detection model, obtain objects in at least one sample image output from the initial object detection model in a case where the at least one sample image in each marked sample image set is input to the initial object detection model to perform object detection; adopt a preset loss function to obtain an average loss values corresponding to each marked sample image set according to objects of at least one object type in the at least one sample image and the objects in the at least one sample image output from the initial object detection model; and adopt a stochastic gradient descent manner to update the object detection model according to the average loss values corresponding to the marked sample image set.

In some other embodiments, the apparatus 140 further includes an updating module 144. The updating module 144 is used to: while the first-layer feature extraction network, the second-layer feature extraction network and the network layer having the same training identifier as the marked sample image set of the initial object detection model layer are trained by using each marked sample image set to obtain the object detection model, obtain at least one target feature map and confidence level(s) of at least one object corresponding to the at least one target feature map that are output from the initial object detection model in a case where the at least one sample image in each marked sample image set is input to the initial object detection model to perform object detection, the at least one sample image in the marked sample image set and the at least one target feature map being in a one-to-one correspondence and a target feature map being a last-layer feature map extracted from a corresponding sample image by the initial object detection model; for the at least one sample image in the marked sample image set, determine that object(s) of at least one object type in each sample image are positive sample(s) corresponding to the sample image, and determine negative sample(s) corresponding to the sample image within a preset range centered on the object of at least one object type in the sample image; adopt a preset loss function to obtain a loss value corresponding to each marked sample image set according to positive sample(s) and negative sample(s) that correspond to the at least one sample image, and the at least one target feature map and the confidence level(s) of the at least one object corresponding to the at least one target feature map that are output from the initial object detection model; and adopt a stochastic gradient descent manner to update the object detection model according to the loss value corresponding to each marked sample image set.

In some other embodiments, the apparatus 140 further includes an updating module 144. The updating module 144 is used to: while the first-layer feature extraction network, the second-layer feature extraction network and the network layer having the same training identifier as the marked sample image set of the initial object detection model layer are trained by using each marked sample image set to obtain the object detection model, obtain at least one target feature map, confidence levels of pixels in the at least one target feature map and confidence level(s) of at least one object corresponding to the at least one target feature map that are output from the initial object detection model in a case where the at least one sample image in each marked sample image set is input to the initial object detection model to perform object detection, the at least one sample image and the at least one target feature map being in a one-to-one correspondence and a target feature map being a last-layer feature map extracted from a corresponding sample image by the initial object detection model; for the at least one sample image in the marked sample image set, determine that object(s) of at least one object type in each sample image are positive sample(s) corresponding to the sample image; determine a maximum confidence level in confidence levels of pixels included in a first region of a target feature map corresponding to the sample image, the first region being a region of the target feature map in which the object(s) of at least one object type in the sample image are located; for other region of the target feature map except the first region, exclude pixels included in the other region, differences between confidence levels of these pixels and the maximum confidence level being less than a preset confidence threshold, and determine negative sample(s) corresponding to the target feature map from the region in which excluded pixels are located; determine a corresponding region of the sample image to which the negative sample(s) corresponding to the target feature map is mapped, and determine negative sample(s) corresponding to the sample image in the corresponding region; adopt a preset loss function to obtain a loss value corresponding to each marked sample image set according to positive samples and negative samples that correspond to the at least one sample image, and the at least one target feature map and the confidence(s) of the at least one object corresponding to the at least one target feature map that are output from the initial object detection model; and adopt a stochastic gradient descent manner to update the object detection model according to the loss value corresponding to each marked sample image set.

Of course, the apparatus 140 for training the object detection model provided in the embodiments of the present disclosure includes, but is not limited to, the above modules.

Figure 15:
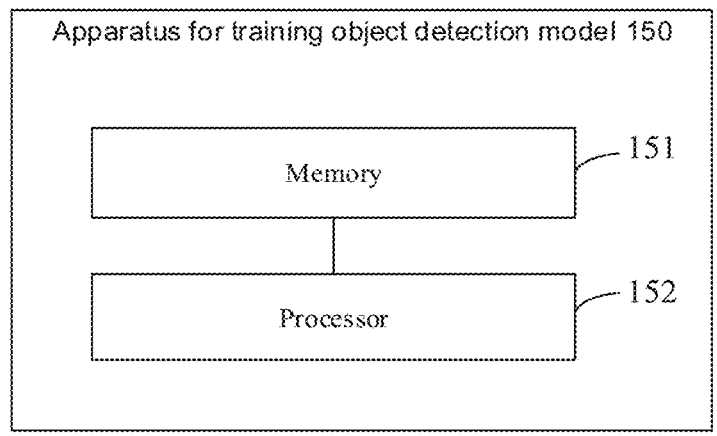
FIG. 15 is a structural diagram of another apparatus for training an object detection model, in accordance with some embodiments.

Some embodiments of the present disclosure further provide an apparatus for training an object detection model. As shown in FIG. 15, the apparatus for training the object detection model 150 includes a memory 151 and a processor 152. The memory 151 is coupled to the processor 152. The memory 151 is used for storing computer program codes. The computer program codes include computer instructions. The processor 152, when executing the computer instructions, causes the apparatus for training the object detection model 150 to perform the steps performed by the apparatus for training the object detection model in the processes of the method illustrated in the embodiments described above.

In actual implementation, the image obtaining module 141, the model obtaining module 142, the training module 143 and the updating module 144 may be implemented by the processor 152 calling the computer program codes in the memory 151 as shown in FIG. 15. For the specific implementation process of the modules, reference may be made to the description of the method for training the object detection method shown in FIG. 4, 5, 8 or 11, which will not be repeated here.

Figure 16:
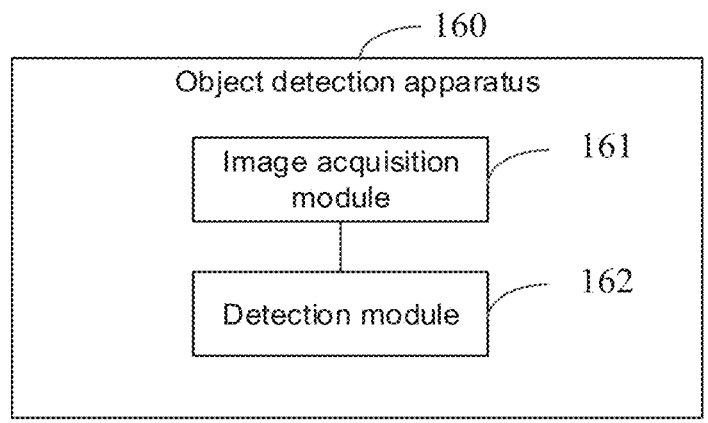
FIG. 16 is a structural diagram of an object detection apparatus, in accordance with some embodiments.

Some embodiments of the present disclosure provide an object detection apparatus. FIG. 16 is a structural diagram of the object detection apparatus in accordance with embodiments of the present disclosure. The object detection apparatus 160 may include an image acquisition module 161 used for acquiring an image to be detected and a detection module 162. The detection module 162 is used for inputting the image to be detected to the object detection model, detecting objects of N object types to obtain at least one object and at least one position corresponding to the at least one object included in the image to be detected.

Object type(s) of the at least one object all belong to the N object types. The object detection model is the object detection model trained by the apparatus for training the object detection model in any one of the above embodiments.

Of course, the object detection apparatus 160 provided in the embodiments of the present disclosure includes, but is not limited to, the above modules.

Figure 17:
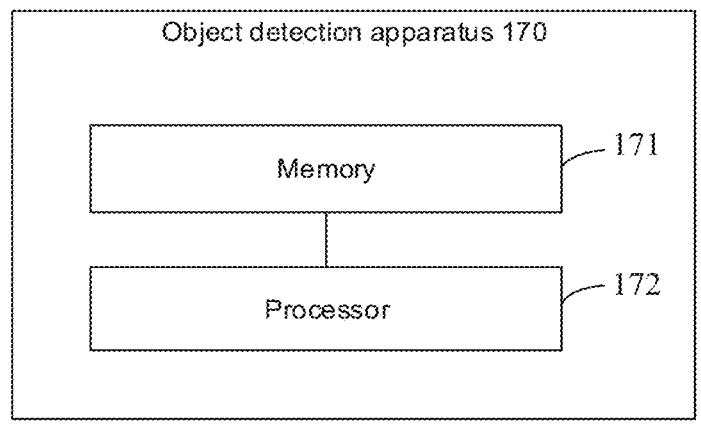
FIG. 17 is a structural diagram of another object detection apparatus, in accordance with some embodiments.

Some embodiments of the present disclosure provide an object detection apparatus. As shown in FIG. 17, the object detection apparatus 170 includes a memory 171 and a processor 172. The memory 171 is coupled to the processor 172. The memory 171 is used for storing computer program codes, and the computer program codes include computer instructions. The processor 172, when executing the computer instructions, causes the object detection apparatus 170 to perform the steps performed by the object detection apparatus in the processes of the method illustrated in the embodiments described above.

In actual implementation, the image acquisition module 161 and the detection module 162 may be implemented by the processor 172 calling the computer program codes in the memory 171 as shown in FIG. 17. For the specific implementation process of the above modules, reference may be made to the description of the object detection method shown in FIG. 13, which will not be repeated here.

Some embodiments of the present disclosure provide a computer-readable storage medium (e.g., a non-transitory computer-readable storage medium). When running on the apparatus for training the object detection model, the computer program causes the apparatus for training the object detection model to implement one or more steps in the method for training the object detection model as described in any one of the above embodiments. Alternatively, when running on the object detection apparatus, the computer program causes the object detection apparatus to implement one or more steps in the object detection method described in any one of the above embodiments.

For example, the computer-readable storage medium may include, but is not limited to: a magnetic storage device (e.g., a hard disk, a floppy disk or a magnetic tape, etc.), an optical disk (e.g., a compact disk (CD), a digital versatile disk (DVD)), a smart card and a flash memory device (e.g., an erasable programmable read-only memory (EPROM), a card, a stick or a key driver). Various computer-readable storage media described in the embodiments of the present disclosure may represent one or more devices and/or other machine-readable storage media for storing information. The term "machine-readable storage media" may include, but is not limited to, wireless channels and various other media capable of storing, containing and/or carrying instructions and/or data.

Some embodiments of the present disclosure further provide a computer program product. The computer program product includes computer program instructions that, when executed on the apparatus for training the object detection model, cause the apparatus for training the object detection model to perform one or more steps in the method for training the object detection model described in any one of the above embodiments; or when the computer program instructions are executed on the object detection apparatus, the computer program instructions cause the object detection apparatus to perform one or more steps in the object detection method described in any one of the above embodiments.

Some embodiments of the present disclosure further provide a computer program. When the computer program is executed on the apparatus for training the object detection model, the computer program causes the apparatus for training the object detection model to perform one or more steps in the method for training the object detection model described in any one of the above embodiments; or when the computer program is executed on the object detection apparatus, the computer program causes the object detection apparatus to perform one or more steps in the object detection method described in any one of the above embodiments.

Beneficial effects of the computer-readable storage medium, computer program product and computer program described above are the same as the beneficial effects of the object detection methods described in some of the above embodiments, which will not be repeated here.

The above descriptions are merely specific implementations of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. A method for training an object detection model, the method comprising:
   obtaining M sample image sets, wherein a sample image set includes at least one sample image and at least one object type of at least one object in each sample image, an object type corresponds to one sample image set, the M sample image sets correspond to N object types, M is a positive integer less than or equal to N, and N is a positive integer greater than 1;
   obtaining an initial object detection model, wherein the initial object detection model includes M network layers or an object detection network; the M network layers each are used for detecting at least one object of at least one object type; a number of output channels of the object detection network is N, and the object detection network is used for detecting objects of N object types; and
   training the initial object detection model by using the M sample image sets to obtain the object detection model, wherein
   obtaining the initial object detection model, includes:
      obtaining a first model, wherein the first model includes a first-layer feature extraction network, a second-layer feature extraction network and a detection output network; the first-layer feature extraction network is capable of extracting a feature map from an input of the first model to obtain a first-layer feature map, the second-layer feature extraction network is capable of performing feature fusion on the first-layer feature map to obtain a second-layer feature map, and the detection output network is capable of detecting at least one object and at least one position corresponding to the at least one object in the second-layer feature map;
   and the first model is a network model generated based on an anchor manner;
   determining N network layers according to the detection output network;
   replacing the detection output network of the first model with the N network layers, wherein the second-layer feature extraction network is connected to the N network layers, and M is equal to N; and
   determining that a modified first model is the initial object detection model.

2. The method according to claim 1, wherein training the initial object detection model by using the M sample image sets to obtain the object detection model, includes:
   determining a one-to-one correspondence relationship between the M sample image sets and the N network layers of the initial object detection model;
   marking the sample image set and a corresponding network layer with a same training identifier, wherein a training identifier is used to mark one sample image set and one network layer; and
   training, by using each marked sample image set, the first-layer feature extraction network, the second-layer feature extraction network and the corresponding network layer having the same training identifier as the marked sample image set of the initial object detection model layer to obtain the object detection model.

3. The method according to claim 2, wherein during training the first-layer feature extraction network, the second-layer feature extraction network and the network layer having the same training identifier as the marked sample image set of the initial object detection model layer by using each marked sample image set to obtain the object detection model, the method further comprises:
   obtaining objects in at least one sample image output from the initial object detection model when the at least one sample image in each marked sample image set is input to the initial object detection model to perform object detection; and
   the method further comprises:
   adopting a preset loss function to obtain an average loss value corresponding to each marked sample image set according to objects of at least one object type in the at least one sample image and the objects in the at least one sample image output from the initial object detection model; and
   adopting a stochastic gradient descent manner to update the object detection model according to the average loss value corresponding to each marked sample image set.

4. The method according to claim 2, wherein during training the first-layer feature extraction network, the second-layer feature extraction network and the network layer having the same training identifier as the marked sample image set of the initial object detection model layer by using each marked sample image set to obtain the object detection model, the method further comprises:
   obtaining at least one target feature map and at least one confidence level of at least one object corresponding to the at least one target feature map that are output from the initial object detection model when at least one sample image in each marked sample image set is input to the initial object detection model to perform object detection; wherein the at least one sample image in the marked sample image set and the at least one target feature map are in a one-to-one correspondence, a target feature map is a last-layer feature map extracted from a corresponding sample image by the initial object detection model; and the method further comprises:

for the at least one sample image in the marked sample image set, determining that at least one object of at least one object type in each sample image are at least one positive sample corresponding to the sample image;

determining a negative sample corresponding to the sample image within a preset range centered on an object of at least one object type in the sample image;

adopting a preset loss function to obtain a loss value corresponding to each marked sample image set according to at least one positive sample and at least one negative sample that correspond to the at least one sample image, and the at least one target feature map and the at least one confidence level of the at least one object corresponding to the at least one target feature map that are output from the initial object detection model; and adopting a stochastic gradient descent manner to update the object detection model according to the loss value corresponding to each marked sample image set.

5. The method according to claim 2, wherein during training the first-layer feature extraction network, the second-layer feature extraction network and the network layer having the same training identifier as the marked sample image set of the initial object detection model layer by using each marked sample image set to obtain the object detection model, the method further comprises:

obtaining at least one target feature map, confidence levels of pixels in the at least one target feature map and at least one confidence level of at least one object corresponding to the at least one target feature map that are output from the initial object detection model when at least one sample image in each marked sample image set is input to the initial object detection model to perform object detection; wherein the at least one sample image in the marked sample image set and the at least one target feature map are in a one-to-one correspondence, a target feature map is a last-layer feature map extracted from a corresponding sample image by the initial object detection model;

the method further comprises:

for the at least one sample image in the marked sample image set, determining that at least one object of at least one object type in each sample image are at least one positive sample corresponding to the sample image;

determining a maximum confidence level in confidence levels of pixels included in a first region of a target feature map corresponding to the sample image, the first region being a region of the target feature map in which the at least one object of at least one object type in the sample image are located;

excluding pixels included in other region of the target feature map except the first region, differences between confidence levels of the pixels in the other region and the maximum confidence level being less than a preset confidence threshold;

determining at least one negative sample corresponding to the target feature map from the region in which excluded pixels are located;

determining a corresponding region of the sample image to which the at least one negative sample corresponding to the target feature map is mapped, and at least one negative sample corresponding to the sample image in the corresponding region;

adopting a preset loss function to obtain a loss value corresponding to each marked sample image set according to at least one positive sample and at least one negative sample that correspond to the at least one sample image, and the at least one target feature map and the at least one confidence level of the at least one object corresponding to the at least one target feature map that are output from the initial object detection model; and adopting a stochastic gradient descent manner to update the object detection model according to the loss value corresponding to the marked sample image set.

6. The method according to claim 1, wherein determining the N network layer according to the detection output model, includes:

determining that the detection output network is a group of detection units, and determining that each network layer in the N network layers includes at least one group of detection units; or modifying the detection output network to obtain the group of detection units, and determining that each network layer in the N network layers includes the at least one group of detection units, wherein a number of groups of detection units included in each network layer is one, two or three.

7. The method according to claim 6, wherein modifying the detection output network to obtain the group of detection units, includes:

modifying a size of a convolutional kernel of a convolutional layer in a case where the detection output network includes the convolutional layer, and determining that a modified convolution layer, a batch normalization (BN) layer and a rectified linear unit (ReLU) constitute the group of detection units; wherein the size of the modified convolution kernel is 3×3, 5×5, or 7×7, and in the group of detection units, the modified convolution layer is connected to the BN layer, and the BN layer is connected to the ReLU; or determining that the convolutional layer, the BN layer and the ReLU constitute the group of detection units; wherein in the group of detection units, the convolution layer is connected to the BN layer, and the BN layer is connected to the ReLU.

8. An object detection method, comprising:

obtaining an image to be detected;

inputting the image to be detected to an object detection model, and detecting objects of N object types to obtain at least one object and at least one position corresponding to the at least one object that are included in the image to be detected, at least one object type of the at least one object belonging to the N object types, wherein the object detection model is the object detection model trained by the method for training the object detection model according to claim 1.

9. An object detection apparatus, comprising a memory and a processor; wherein the memory is coupled to the processor; the memory is used for storing computer program codes, and the computer program codes includes computer instructions;

the processor causes, when executing the computer instructions, the apparatus to perform the object detection method according to claim 8.

10. A non-transitory computer-readable storage medium having stored thereon a computer program that, when executed on an object detection apparatus, causes the object detection apparatus to perform the object detection method according to claim 8.

11. An apparatus for training an object detection model, comprising a memory and a processor; wherein the memory is coupled to the processor; the memory is used for storing computer program codes, and the computer program codes includes computer instructions;

the processor causes, when executing the computer instructions, the apparatus to perform the method for training the object detection model according to claim 1.

12. A non-transitory computer-readable storage medium having stored thereon a computer program that, when executed on an apparatus for training an object detection model, causes the apparatus for training the object detection model to perform the method for training the object detection model according to claim 1.

13. A method for training an object detection model, the method comprising:

obtaining M sample image sets, wherein a sample image set includes at least one sample image and at least one object type of at least one object in each sample image, an object type corresponds to one sample image set, the M sample image sets correspond to N object types, M is a positive integer less than or equal to N, and N is a positive integer greater than 1;

obtaining an initial object detection model, wherein the initial object detection model includes M network layers or an object detection network; the M network layers each are used for detecting at least one object of at least one object type; a number of output channels of the object detection network is N, and the object detection network is used for detecting objects of N object types; and training the initial object detection model by using the M sample image sets to obtain the object detection model, wherein obtaining the initial object detection model, includes:

obtaining a second model, wherein the second model includes: a down-sampling module, an up-sampling module, an object detection network and an object position detection network; the object detection network of the second model is used for detecting an object type of an object of at least one object type, and the object position detection network is used for detecting a position of the object of at least one object type; and the second model is a network model generated based on an anchor-free manner;

modifying a number of output channels of the object detection network of the second model to be N; and determining that a modified second model is the initial object detection model.

14. The method according to claim 13, wherein the object position detection network includes a height and width detection network and a center point detection network; the height and width detection network is used for detecting a height and width of the object of at least one object type, and the center point detection network is used for detecting a position of a center point of the object of at least one object type;

the method further comprises:

modifying a number of output channels of the high and width detection network of the second model to be 2, and modifying a number of output channels of the center point detection network of the second model to be 2.

15. An object detection method, comprising:

obtaining an image to be detected;

inputting the image to be detected to an object detection model, and detecting objects of N object types to obtain at least one object and at least one position corresponding to the at least one object that are included in the image to be detected, at least one object type of the at least one object belonging to the N object types, wherein the object detection model is the object detection model trained by the method for training the object detection model according to claim 13.

16. An apparatus for training an object detection model, comprising a memory and a processor; wherein the memory is coupled to the processor; the memory is used for storing computer program codes, and the computer program codes includes computer instructions;

the processor causes, when executing the computer instructions, the apparatus to perform the method for training the object detection model according to claim 13.

17. A method for training an object detection model, the method comprising:

obtaining M sample image sets, wherein a sample image set includes at least one sample image and at least one object type of at least one object in each sample image, an object type corresponds to one sample image set, the M sample image sets correspond to N object types, M is a positive integer less than or equal to N, and N is a positive integer greater than 1;

obtaining an initial object detection model, wherein the initial object detection model includes M network layers or an object detection network; the M network layers each are used for detecting at least one object of at least one object type; a number of output channels of the object detection network is N, and the object detection network is used for detecting objects of N object types; and training the initial object detection model by using the M sample image sets to obtain the object detection model, wherein obtaining the initial object detection model, includes:

obtaining M first models, the M first models being determined as the initial object detection model; wherein a first model in the M first models includes a first-layer feature extraction network, a second-layer feature extraction network and a detection output network; the first-layer feature extraction network is capable of extracting a feature map from an input of the first model to obtain a first-layer feature map, the second-layer feature extraction network is capable of performing feature fusion on the first-layer feature map to obtain a second-layer feature map, and the detection output network is capable of detecting at least one object and at least one position corresponding to the at least one object in the second-layer feature map.

18. The method according to claim 17, wherein training the initial object detection model by using the M sample image sets to obtain the object detection model, includes:
- determining a number of layers of a shared network corresponding to the M first models, wherein the number of layers of the shared network is set according to at least one of N and a total number of sample images included in the M sample image sets;
- inputting the M sample image sets to the M first models, respectively;
- training, by using each sample image set, other networks except the shared network that remains unchanged in a corresponding first model, so as to obtain M trained first models, wherein the shared network is a network constituted by first X networks in the first model, and X is the number of layers of the shared network; and
- splicing the shared network and other networks except the shared network in each of the M trained first models to obtain the object detection model, wherein in the object detection model, the shared network is connected to the other networks.

19. An object detection method, comprising:
- obtaining an image to be detected;
- inputting the image to be detected to an object detection model, and
- detecting objects of N object types to obtain at least one object and at least one position corresponding to the at least one object that are included in the image to be detected, at least one object type of the at least one object belonging to the N object types, wherein
- the object detection model is the object detection model trained by the method for training the object detection model according to claim 17.

20. An apparatus for training an object detection model, comprising a memory and a processor; wherein the memory is coupled to the processor; the memory is used for storing computer program codes, and the computer program codes includes computer instructions;
- the processor causes, when executing the computer instructions, the apparatus to perform the method for training the object detection model according to claim 17.

* * * * *